(12) United States Patent
Chirokov et al.

(10) Patent No.: US 11,153,615 B2
(45) Date of Patent: Oct. 19, 2021

(54) METHOD AND APPARATUS FOR STREAMING PANORAMIC VIDEO

(71) Applicant: COMET TECHNOLOGIES, LLC, Mayfield Heights, OH (US)

(72) Inventors: Valeri B. Chirokov, Orange Village, OH (US); Vladimir E. Koltunov, Saint-Petersburg (RU)

(73) Assignee: Comet Technologies, LLC, Mayfield Heights, OH (US)

( * ) Notice: Subject to any disclaimer, the term of this patent is extended or adjusted under 35 U.S.C. 154(b) by 425 days.

(21) Appl. No.: 16/306,065

(22) PCT Filed: Jun. 1, 2017

(86) PCT No.: PCT/US2017/035478
§ 371 (c)(1),
(2) Date: Nov. 30, 2018

(87) PCT Pub. No.: WO2017/210444
PCT Pub. Date: Dec. 7, 2017

(65) Prior Publication Data
US 2019/0297363 A1    Sep. 26, 2019

Related U.S. Application Data

(60) Provisional application No. 62/344,543, filed on Jun. 2, 2016.

(51) Int. Cl.
*H04N 21/2343* (2011.01)
*H04N 19/597* (2014.01)
(Continued)

(52) U.S. Cl.
CPC ... *H04N 21/234345* (2013.01); *H04N 19/597* (2014.11); *H04N 21/21805* (2013.01);
(Continued)

(58) Field of Classification Search
CPC ............................................. H04N 21/234345
See application file for complete search history.

(56) References Cited

U.S. PATENT DOCUMENTS

2010/0050221 A1   2/2010  McCutchen et al.
2014/0059166 A1   2/2014  Mann et al.
(Continued)

FOREIGN PATENT DOCUMENTS

| CN | 101841694 A | 9/2010 |
|---|---|---|
| CN | 104735464 A | 6/2015 |
| EP | 2824884 A1 | 1/2015 |

OTHER PUBLICATIONS

English Bibliography of Chinese Application No. CN101841694A, Published on Sep. 22, 2010, Printed from Derwent Innovations on Jan. 19, 2021, 6 pages.
(Continued)

*Primary Examiner* — Michael H Hong
(74) *Attorney, Agent, or Firm* — Fay Sharpe LLP

(57) ABSTRACT

A method of streaming panoramic video is provided. In one embodiment, the method includes receiving a panoramic video stream formed by a sequence of stitched panoramic frames, each stitched panoramic frame representative of a panoramic view defined by horizontal and vertical dimensions in relation to a central viewing point; splitting the stitched panoramic frames into pieces to create split frames and split frame streams; encoding the split frames for each split frame stream at multiple bitrates to form multiple resolution qualities for each split frame stream; and combining the split frame streams to form a video bunch frame stream. An apparatus for streaming equirectangular video is also provided. A non-transitory computer-readable medium storing program instructions is also provided. When
(Continued)

executed by a computer or processor, the program instructions cause the apparatus to perform the method.

21 Claims, 20 Drawing Sheets

(51) Int. Cl.
    *H04N 21/218* (2011.01)
    *H04N 21/4728* (2011.01)
    *H04N 21/2365* (2011.01)

(52) U.S. Cl.
    CPC ... *H04N 21/2365* (2013.01); *H04N 21/23439* (2013.01); *H04N 21/234363* (2013.01); *H04N 21/4728* (2013.01)

(56) References Cited

U.S. PATENT DOCUMENTS

| | | |
|---|---|---|
| 2014/0269936 A1 | 9/2014 | Shivadas et al. |
| 2015/0172545 A1* | 6/2015 | Szabo .............. H04N 5/23238 348/36 |
| 2015/0199366 A1 | 7/2015 | Marlatt et al. |
| 2015/0201197 A1* | 7/2015 | Marlatt .............. H04N 21/4307 375/240.03 |
| 2017/0078447 A1 | 3/2017 | Hancock et al. |

OTHER PUBLICATIONS

English Bibliography of Chinese Application No. CN104735464A, Published on Jun. 24, 2015, Printed from Derwent Innovations on Jan. 19, 2021, 5 pages.

International Search Report for PCT Application No. PCT/US2017/035478, dated Aug. 10, 2017, 4 pages.

Written Opinion of the International Searching Authority for PCT Application No. PCT/US2017/035478, dated Aug. 10, 2017, 6 pages.

\* cited by examiner

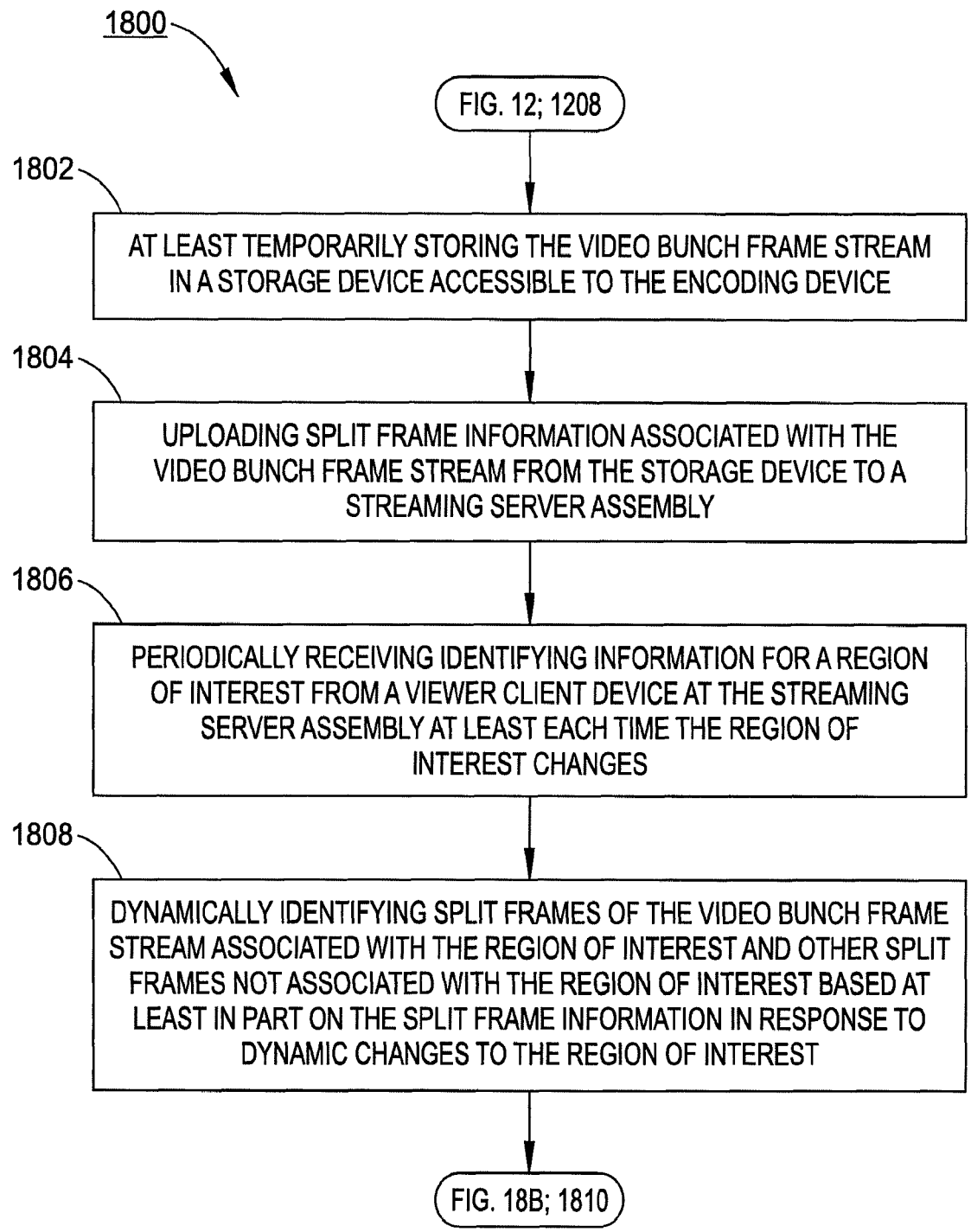

METHOD AND APPARATUS FOR STREAMING PANORAMIC VIDEO

CROSS-REFERENCE TO RELATED APPLICATIONS

The present application claims priority to and the benefit of U.S. Provisional Patent Application Ser. No. 62/344,543, filed Jun. 2, 2016 and entitled METHOD AND APPARATUS FOR STREAMING EQUIRECTANGULAR VIDEO, the entirety of which is incorporated herein by reference.

FIELD OF THE INVENTION

This disclosure relates to providing a visual simulation for a virtual reality environment. Various embodiments of methods, processes, and systems are disclosed for capturing or uploading, stitching, encoding, and streaming monoscopic and stereoscopic panoramic video morphed into a sphere (panoramic) for presentation. The presentation simulates an environment suitable for use with other equipment in a virtual reality.

BACKGROUND

VR content may include video and audio data. VR content may include cinematic films. A consumer of VR content (hereinafter, "viewer") may look in different directions and experience different objects, narratives and/or sounds. VR content allows viewers to perceive between three and six directions and/or degrees of freedom. When experiencing VR content, the displayed video content may shift in response to the viewer looking up, down and side-to-side (pitch, yaw and roll). When experiencing VR content, the displayed video content may shift in response to movement of the viewer in a direction. Experiencing VR content typically requires specialized equipment to provide the desired experience. Such specialized equipment may include wearable headsets and/or specialized processors.

A local copy of the VR content is typically obtained beforehand that is easily accessible to the viewer equipment. Typically, electronic data files storing VR content are large. For example, viewing VR content may require 750 Mbyte to 1 Gigabyte per minute of video data.

A "download before you experience" VR model has drawbacks. The viewer may have to download an entire file before it can be viewed. VR data files are large and may take a relatively long time to download. Download times may be further slowed as a result of Internet Service Providers (ISPs) assigning a lower transmission priority to larger files.

Furthermore, a viewer must have available storage capacity to store the VR content. Stored VR data may remain on the viewing device even after the VR data has been viewed resulting in less available storage capacity for the viewer's other needs. Sales of devices capable of VR content playback have been increasing. VR headsets are increasingly operative with other common mobile devices. For example, current VR headsets utilize the screens and processing power of a viewer's smartphone or other mobile device. VR headsets and mobile devices typically operate on battery power. Viewing VR content may require intensive image processing power, which reduces battery life expectancy of a mobile viewing device.

Demand for access to VR content has been increasing. Viewers are expected to increase demand for real-time and on-demand high quality VR content. Viewers are further expected to demand a wide range of well organized, high-quality VR content that is viewable on the hardware device of their choice.

It would be desirable therefore to provide apparatus and methods for viewing VR content in a manner that provides a viewer with an immersive real-time or on-demand VR experience. It would further be desirable to provide efficient, standardized processing of VR content for viewers in real-time or on-demand modes.

SUMMARY

In various embodiments, the methods, processes, and systems can comprise live capturing or receiving of a plurality of monoscopic or stereoscopic video frame feeds; stitching the plurality of video feeds into a single panoramic video frame stream; encoding and converting the panoramic frame stream into a video bunch frame stream or file, consisting of a plurality of pieces of the video frame in a plurality of resolution qualities represented quantitatively in the form of a bitrate; and streaming bunch frames to a viewer client device as determined by the region of interest of the viewer client device.

In one aspect, a method of streaming panoramic video is provided. In one embodiment, the method includes: receiving a panoramic video stream formed by a sequence of stitched panoramic frames at an encoding device, wherein each stitched panoramic frame is representative of a panoramic view defined by horizontal and vertical dimensions in relation to a central viewing point; splitting the stitched panoramic frames into pieces to create a plurality of split frames and a corresponding plurality of split frame streams relating to split frame portions of the panoramic video stream; encoding the plurality of split frames for each split frame stream at multiple bitrates to form multiple resolution qualities for each split frame stream, wherein the multiple resolution qualities range from a highest resolution quality to a lowest resolution quality; and combining the plurality of split frame streams at each of the multiple resolution qualities to form a video bunch frame stream.

In another aspect, an apparatus for streaming panoramic video is provided. In one embodiment, the apparatus includes: an encoding device configured to receive an panoramic video stream formed by a sequence of stitched panoramic frames, wherein each stitched panoramic frame is representative of a panoramic view defined by horizontal and vertical dimensions in relation to a central viewing point; wherein the encoding device is configured to split the stitched panoramic frames into pieces to create a plurality of split frames and a corresponding plurality of split frame streams relating to split frame portions of the panoramic video stream; wherein the encoding device is configured to encode the plurality of split frames for each split frame stream at multiple bitrates to form multiple resolution qualities for each split frame stream, wherein the multiple resolution qualities range from a highest resolution quality to a lowest resolution quality; wherein the encoding device is configured to combine the plurality of split frame streams at each of the multiple resolution qualities to form a video bunch frame stream.

In yet another aspect, a non-transitory computer-readable medium is provided. The non-transitory computer-readable medium storing program instructions that, when executed by at least one computer or processor, cause a computer-controlled system to perform a method of streaming panoramic video. In one embodiment, the method include: receiving a panoramic video stream formed by a sequence of stitched panoramic frames at an encoding device, wherein each stitched panoramic frame is representative of a panoramic view defined by horizontal and vertical dimensions in relation to a central viewing point; splitting the stitched panoramic frames into pieces to create a plurality of split frames and a corresponding plurality of split frame streams relating to split frame portions of the panoramic video stream; encoding the plurality of split frames for each split frame stream at multiple bitrates to form multiple resolution qualities for each split frame stream, wherein the multiple resolution qualities range from a highest resolution quality to a lowest resolution quality; and combining the plurality of split frame streams at each of the multiple resolution qualities to form a video bunch frame stream.

Additional advantages and embodiments will be set forth in part in the description which follows or may be learned by practice. It is to be understood that both the foregoing brief summary and the following detailed description are exemplary embodiments for explanatory purposes and are not restrictive.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIGS. 18A and 18B, in combination with FIG. 12, provide a flow chart of yet another exemplary embodiment of a process for streaming panoramic video;

DETAILED DESCRIPTION

Before the present methods, processes, and systems are disclosed and described, it is to be understood that the methods, processes and systems are not limited to specific synthetic methods, specific components, or to particular compositions. For example, the various features and components disclosed herein may be combined in any suitable manner to create other embodiments. It is also to be understood that the terminology used herein is for purposes of describing particular embodiments only and is not intended to be limiting.

As used in the diagrams and descriptions, the singular forms "a", "an" and "the" include plural referents unless the context clearly dictates otherwise.

"Exemplary" as used herein means "an example of" and is not meant to convey a sense of an ideal or preferred embodiment.

"Optional" or "optionally" means that the subsequently described event or circumstance may or may not occur, and that the description includes instances where said event or circumstance occurs and instances where it does not.

The present invention may be understood more readily by reference to the description of various embodiments provided herein, the accompanying drawings, and the description of the drawings provided herein.

The present invention is directed to methods, processes, and systems for capturing or uploading, stitching, encoding, and streaming monoscopic and stereoscopic panoramic video morphed into a sphere (panoramic) for presentation. In one embodiment, the methods, processes, and systems can comprise live capturing or receiving a plurality of monoscopic or stereoscopic video frame feeds; stitching the plurality of video feeds into a single panoramic video frame stream; encoding and converting the panoramic frame stream into a video bunch frame stream or file, consisting of a plurality of pieces of the video frame in a plurality of resolution qualities represented quantitatively in the form of a bitrate; and streaming bunch frames to a viewer client device as determined by the region of interest of the viewer client device.

Figure 1:
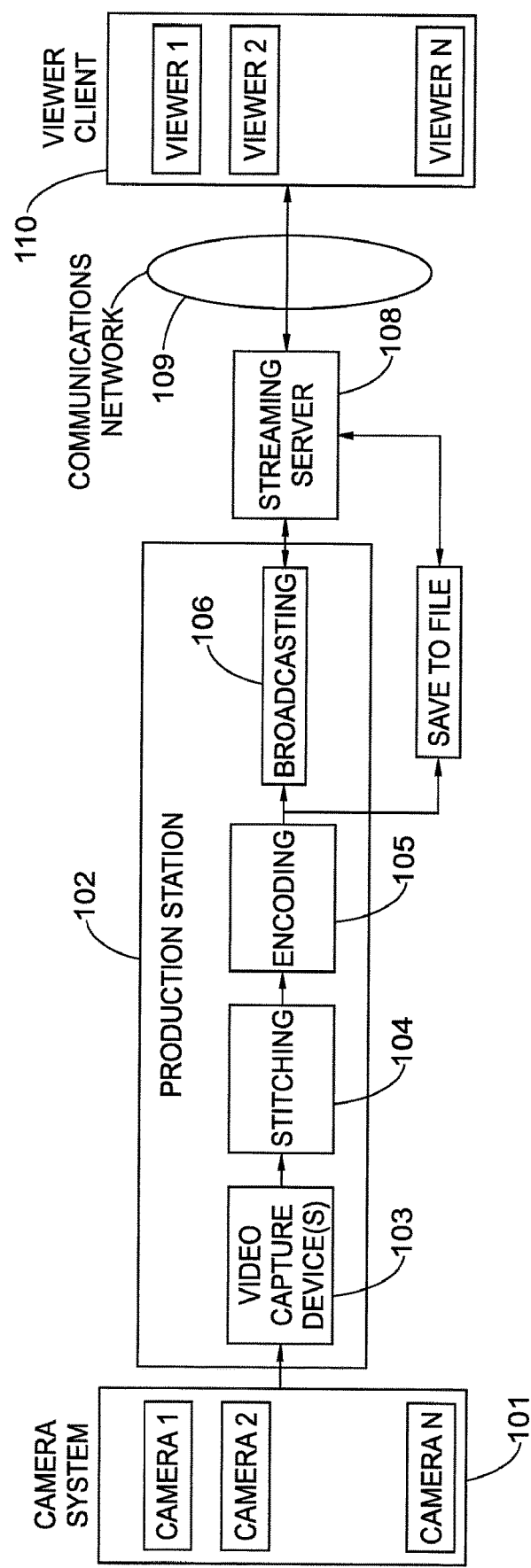
FIG. 1 illustrates an exemplary hardware and software environment for the methods, processes, and systems for streaming monoscopic or stereoscopic panoramic video.

FIG. 1 illustrates an exemplary hardware and software environment implemented in accordance with some embodiments of the methods, processes, and systems for streaming monoscopic or stereoscopic panoramic video. As illustrated the exemplary hardware and software environment includes a camera system 101; a production station 102, consisting of a video capture module 103, a stitching module 104, an encoding module 105, and a broadcasting module 106; a storage device assembly 107; a streaming server assembly 108; a communications network 109, and a viewer client device 110. The network connecting the camera system 101, production station 102, storage device assembly 107, streaming server assembly 108, communications network 109, and the viewer client device 110 may be partially or entirely interconnected via a network comprised of, for example, a local area network (LAN), a wireless LAN (WLAN), a metropolitan area network (MAN), a universal serial bus (USB), a hybrid fiber-coaxial (HFC) network, a satellite network, an Ethernet network, a wireless MAN (WMAN), a wide area network (WAN), a wireless WAN (WWAN), a personal area network (PAN), a wireless PAN (WPAN), the Internet, and/or wireless standards such as, for example, IEEE 802.11 standards, WiFi, Bluetooth, infrared, WiMax, Long Term Evolution (LTE), or any suitable communication network in any suitable combination. The exemplary hardware and software environment formed by these components may also include any other suitable elements to facilitate capturing or uploading, stitching, encoding, and streaming monoscopic and stereoscopic panoramic video for viewing.

The camera system 101 consists of a plurality of camera sets, consisting of individual cameras numbering 2 to N and supporting monoscopic or stereoscopic video. The number of cameras in a camera set may range from 2 to N with a total recorded field of up to 360 degrees, depending on the specific implementation of the present invention. Each camera in a camera set comprising the camera system sends a video feed to the video capture module 103. When the cameras in a given camera set are arranged to provide a total recorded field of up to 360 degrees by 180 degrees, the panoramic video stream resulting from the stitched video feeds can be referred to as an equirectangular video stream.

The production station 102, comprised of a video capture module 103, a stitching module 104, an encoding module 105, and a broadcasting module 106, may be one computing device or each module may be implemented on separate computing devices.

The video capture module 103 is comprised of a plurality of internal or external video capture devices. A video capture device is needed to capture video from each camera in a camera set. The number of video capture devices is dependent on the number of inputs per video capture device and the number of cameras in a camera set. The video capture module captures and temporarily stores video feeds from the camera system 101 before transmission to the stitching module 104.

The stitching module 104 is a computing device operating software that converts separate video feeds from each camera in a camera set via a video capture module 103 into one monoscopic or stereoscopic panoramic video stream.

The encoding module 105 consists of a plurality of computer CPUs and/or GPUs that converts the monoscopic or stereoscopic panoramic video stream, received from the stitching module 104, into a video bunch frame stream or file. The encoding module produces the video bunch frame stream by splitting the monoscopic or stereoscopic video stream into a plurality of pieces and encoding each piece in a plurality of resolution qualities represented quantitatively in the form of a bitrate. The number and shape of each split piece varies based on the desired configuration. The encoding module may utilize any suitable codec, including any current or future standard codec (e.g., H.264, H.265, etc.).

The storage device assembly 107 is comprised of a plurality of storage devices that can optionally receive and save a video bunch frame stream from the encoding module 105. The plurality of storage devices may include internal hard drives, external hard drives, solid state drives (SSDs), VRAMs, DRAMs, network attached storage (NAS) devices, USB thumb drives, flash drives, memory cards, optical drives (e.g., CD drives, DVD drives, etc.), cloud storage (e.g., Amazon S3, Google Drive, Sky Drive, etc.), and other suitable storage devices in any suitable combination.

The broadcasting module 106 receives and temporarily stores a video bunch frame stream from the encoding module 105. Based on the region of interest (ROI) identified by the viewer client device 110 and received from the streaming server assembly 108, the broadcasting module sends pieces of the video bunch frame stream to the streaming server assembly 108.

The streaming server assembly 108 is comprised of a plurality of streaming servers that receive pieces of the video bunch frame stream from the broadcasting module 106 or read from the storage device assembly 107 based on a region of interest (ROI) as identified by the viewer client device 110. The streaming server assembly sends pieces of the video bunch frame stream, as determined by the ROI, to the viewer client device via the communications network 109.

The viewer client device 110 communicates the ROI to the streaming server assembly 108, and displays the received pieces of the video bunch frame stream from the streaming server assembly 108 via the communications network 109. The viewer client device 110 operates on a plurality of viewer devices with each viewer device communicating a unique ROI and receiving a unique set of pieces of the video bunch frame stream from the streaming server assembly 108. The viewer client device 110 can operate on any user device capable of receipt and playback of monoscopic or stereoscopic panoramic video, e.g., personal computing device, smartphone, virtual reality headset, etc.

Figure 2:
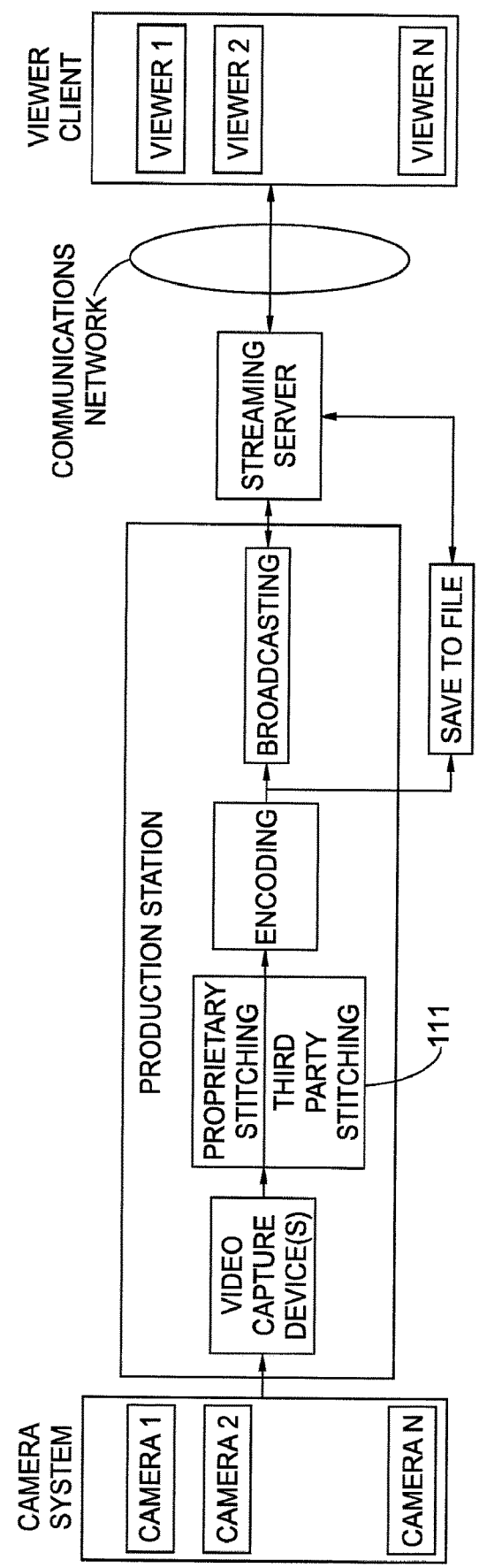
FIG. 2 illustrates an exemplary method, process, and system for streaming monoscopic or stereoscopic panoramic video utilizing either custom, third party, or tailored third party stitching processes.

FIG. 2 illustrates an exemplary method, process, and system for streaming monoscopic or stereoscopic panoramic video utilizing either custom, third party, or tailored third party stitching processes. FIG. 2 shows a further embodiment of FIG. 1, in which the stitching module 104 utilizes custom, third party, or tailored third party stitching software 111.

Figure 3:
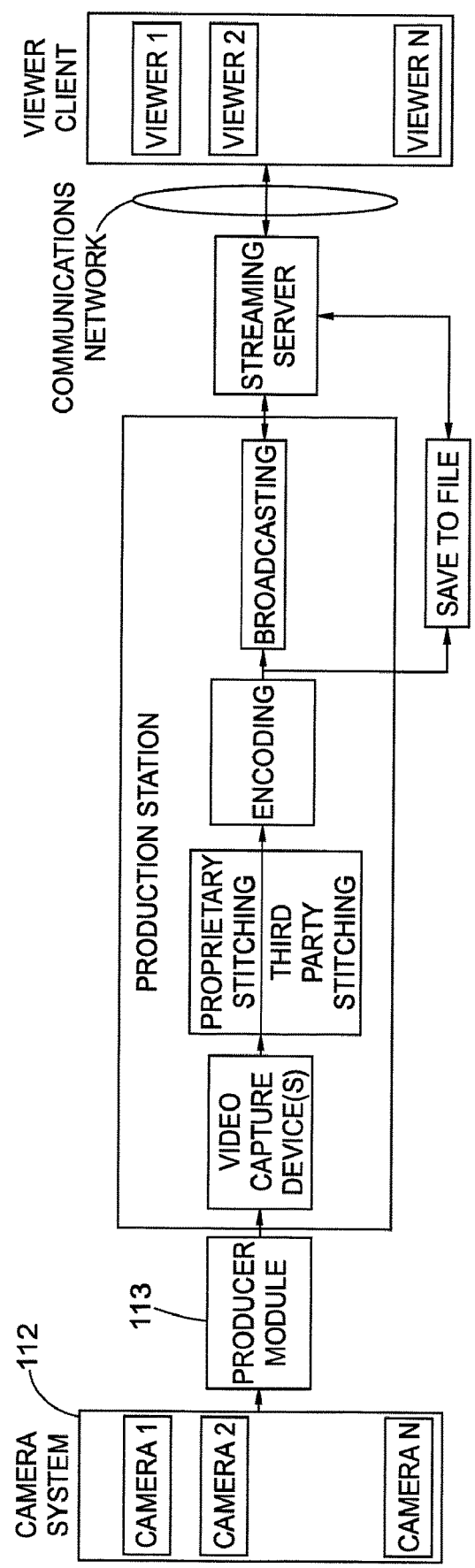
FIG. 3 illustrates an exemplary method, process, and system for streaming monoscopic or stereoscopic panoramic video utilizing camera sets and manual switching of video feeds from different camera sets at the production level.

FIG. 3 illustrates an exemplary method, process, and system for streaming monoscopic or stereoscopic panoramic video utilizing camera sets and manual switching of video fees from different camera sets at the production level. FIG. 3 shows a further embodiment of FIG. 1, in which the camera system 112 is comprised of a plurality of camera sets, each consisting of individual cameras numbering 2 to N and supporting the capture of monoscopic or stereoscopic video. In this embodiment, each camera set sends video streams to a producer subsystem 113. The producer subsystem allows for the manual selection of a single camera set. Only the camera set actively selected by the producer subsystem sends the video feeds for the cameras comprising the selected camera set to the video capture module for processing and eventual playback in the viewer client device.

Figure 4:
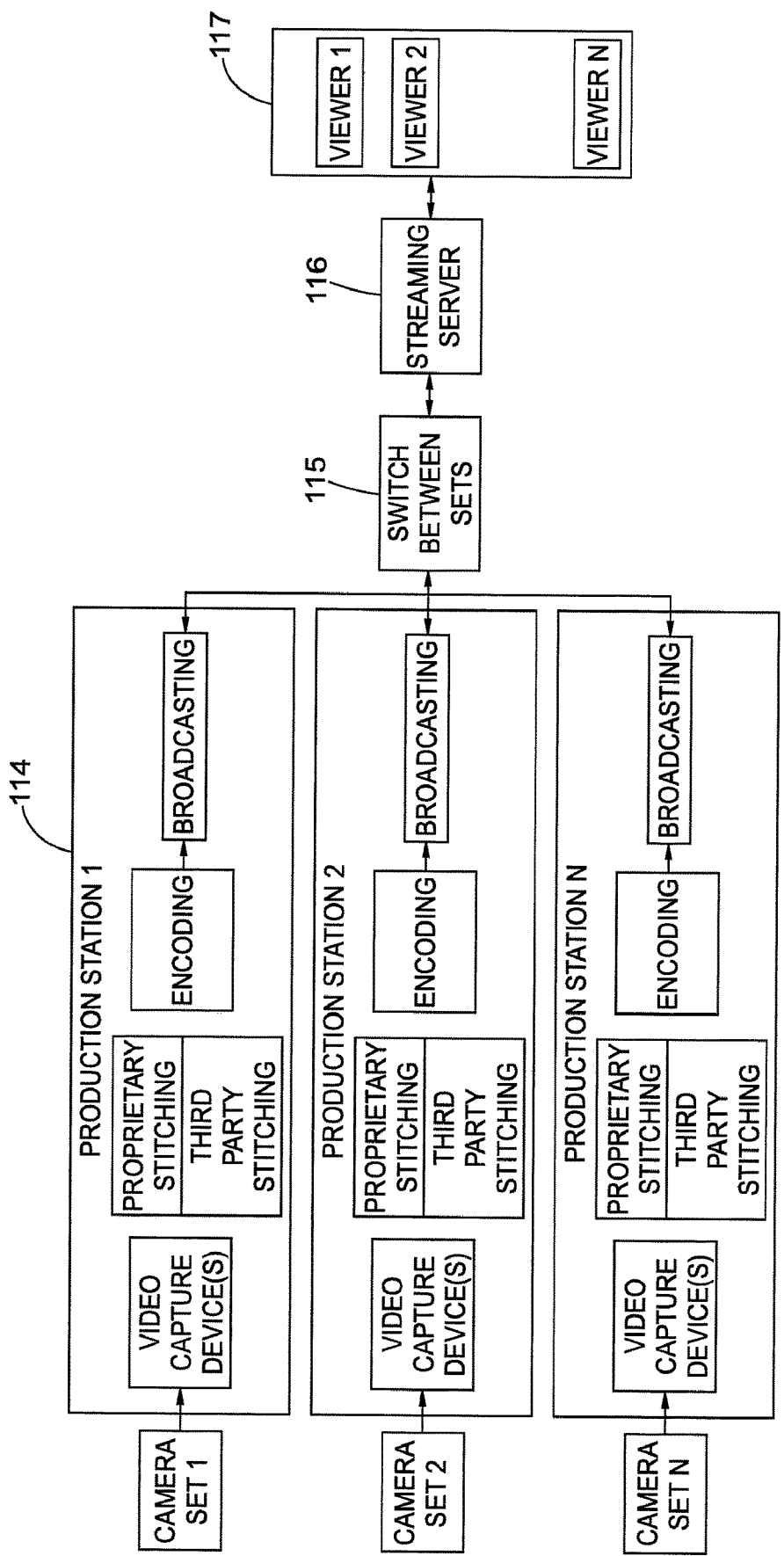
FIG. 4 illustrates an exemplary method, process, and system for streaming monoscopic or stereoscopic panoramic video utilizing multiple camera sets, each with a designated production station, and manual switching between video feeds at the playback level.

FIG. 4 illustrates an exemplary method, process, and system for streaming monoscopic or stereoscopic panoramic video utilizing multiple camera sets, each with a designated production station 114, and manual switching between video feeds 115 at the playback level. FIG. 4 shows a further embodiment of FIG. 1, in which a plurality of camera sets each have a dedicated production station 114. In this embodiment, each camera set and dedicated production station produces a unique video bunch frame stream. The viewer client device 117 communicates a manual camera set selection to the streaming server assembly 116, which switches between the unique video bunch frame streams 115 and sends the video bunch frame stream from the selected camera set to the viewer client device 117 for playback.

Figure 5:
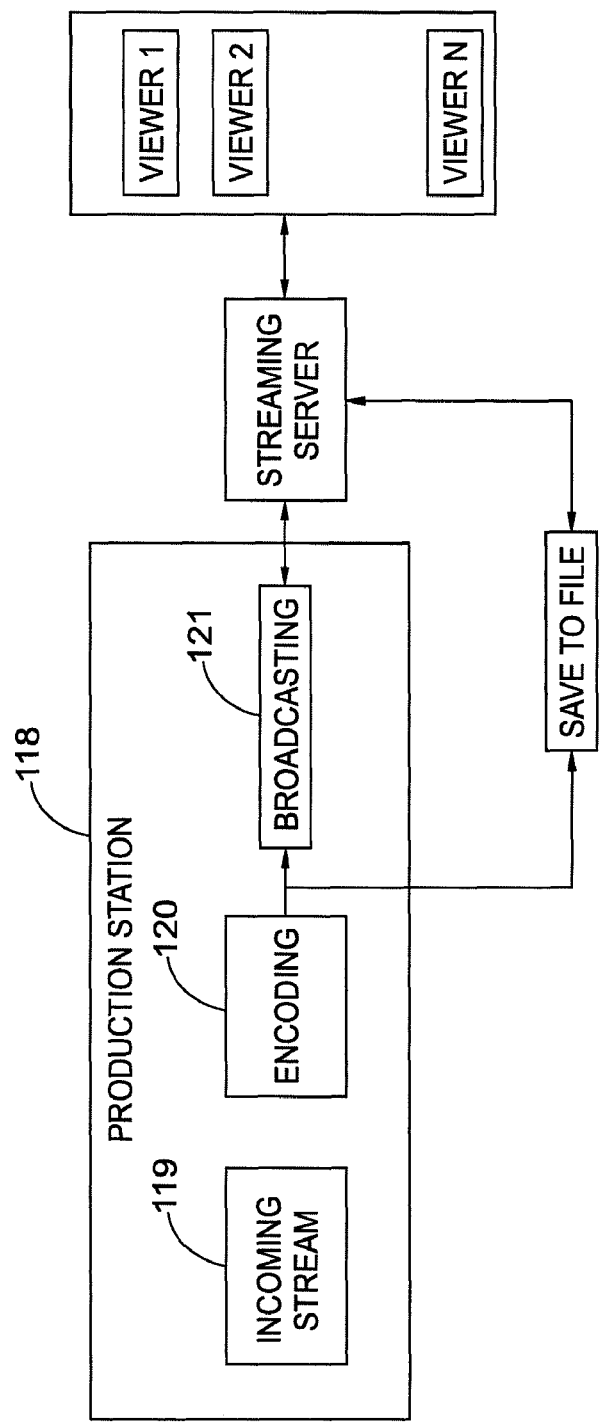
FIG. 5 illustrates an exemplary method, process, and system for streaming a previously stitched monoscopic or stereoscopic panoramic video stream.

FIG. 5 illustrates an exemplary method, process, and system for streaming a previously stitched monoscopic or stereoscopic panoramic video stream. FIG. 5 shows a further embodiment of the production station in FIG. 1, in which the production station 118 is comprised of an incoming stream 119, encoding module 120, and a broadcasting module 121. In this embodiment, the incoming stream consists of a monoscopic or stereoscopic panoramic video stream that is stitched at the point of origin prior to entering the present system, eliminating the need for a stitching module.

Figure 6:
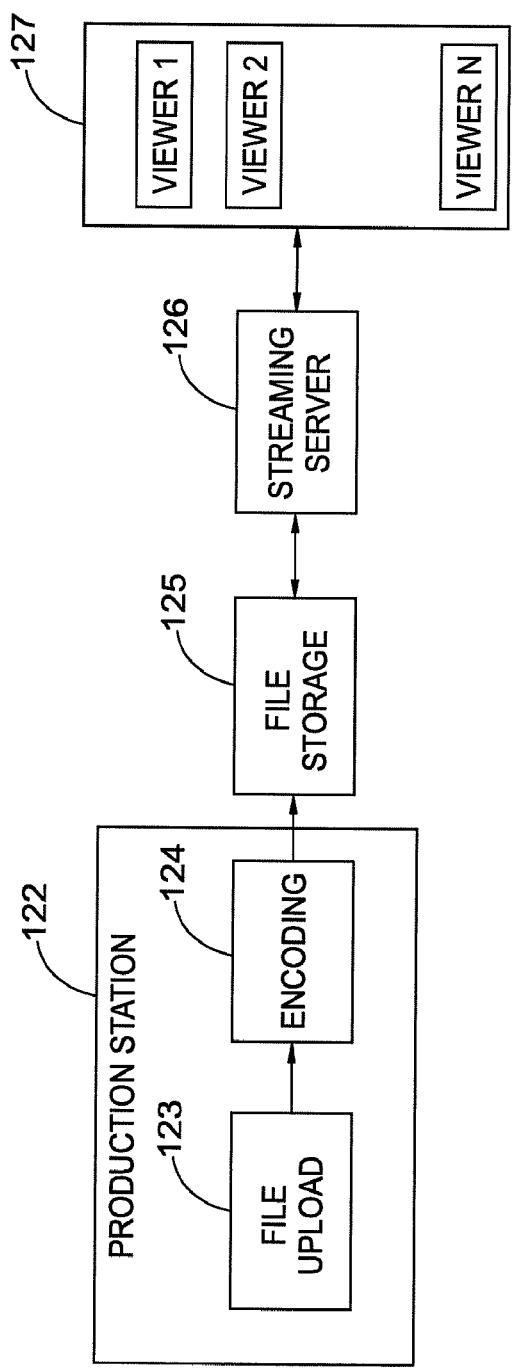
FIG. 6 illustrates an exemplary method, process, and system for uploading and streaming previously produced monoscopic or stereoscopic panoramic video files.

FIG. 6 illustrates an exemplary method, process, and system for uploading and streaming previously produced monoscopic or stereoscopic panoramic video files. FIG. 6 shows a further embodiment of the production station in FIG. 1, in which the production station 122 is comprised of a file upload module 123 and an encoding module 124. In this embodiment, a previously produced and stitched monoscopic or stereoscopic panoramic video file is uploaded to the file upload module 123. The encoding module 124 consists of a plurality of computer CPUs and/or GPUs that converts the monoscopic or stereoscopic panoramic video stream, received from the file upload module 123, into a video bunch frame stream or file. The encoding module produces the video bunch frame stream by splitting the monoscopic or stereoscopic panoramic video stream into a plurality of pieces and encoding each piece in a plurality of resolution qualities represented quantitatively in the form of a bitrate. The number and shape of each split piece varies based on the desired configuration. The encoding module may utilize any suitable codec, including any current or future standard codec (e.g., H.264, H.265, etc.).

The storage device assembly 125 is comprised of a plurality of storage devices that can optionally receive and save a video bunch frame stream from the encoding module 124. The plurality of storage devices may include internal hard drives, external hard drives, solid state drives (SSDs), VRAMs, DRAMs, network attached storage (NAS) devices, USB thumb drives, flash drives, memory cards, optical drives (e.g., CD drives, DVD drives, etc.), cloud storage (e.g., Amazon S3, Google Drive, Sky Drive, etc.), and other suitable storage devices in any suitable combination.

The streaming server assembly 126 is comprised of a plurality of streaming servers that read pieces of the video bunch frame stream read from the storage device assembly 125 based on a region of interest (ROI) as identified by the viewer client device 127. The streaming server assembly sends pieces of the video bunch frame stream, as determined by the ROI, to the viewer client device 127.

Figure 7:
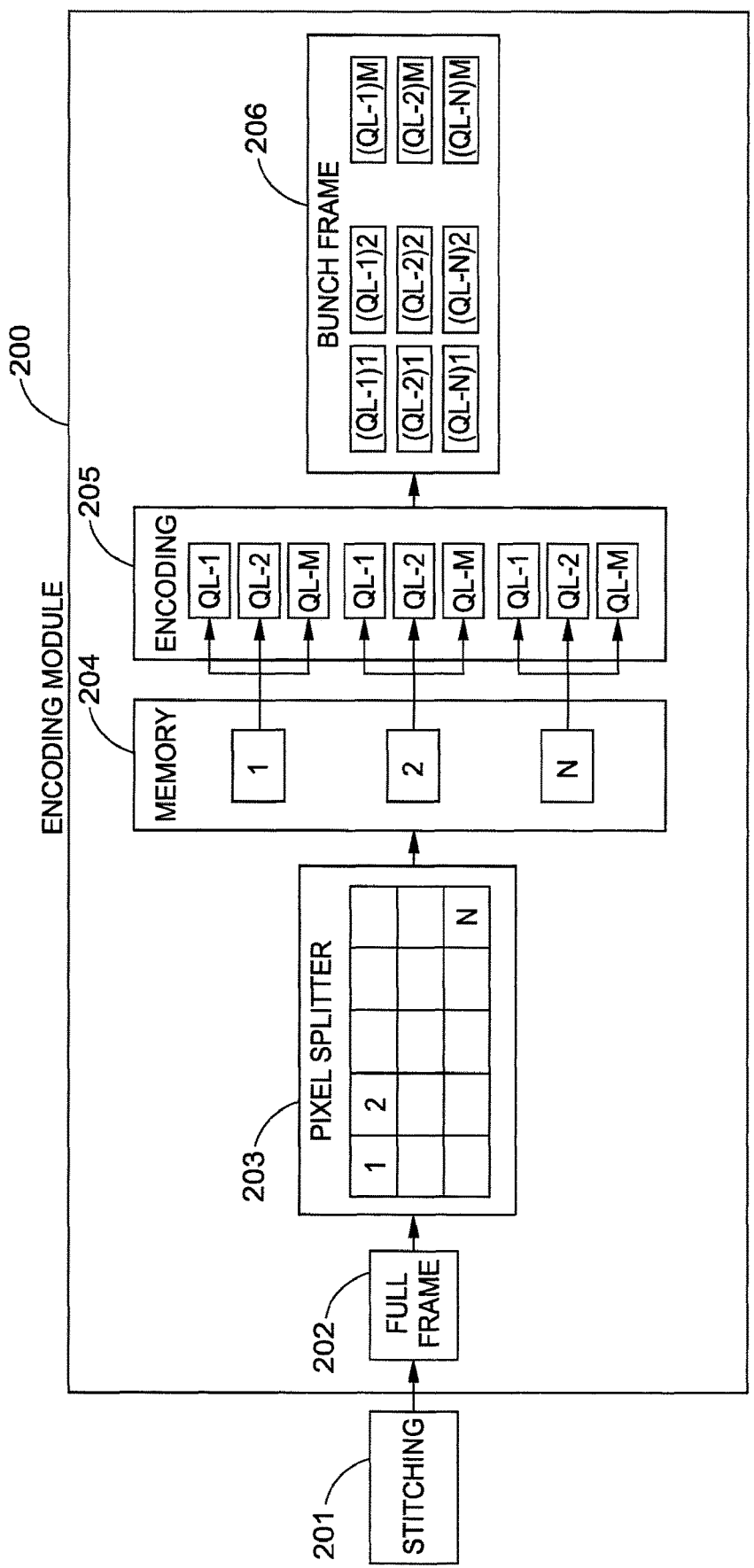
FIG. 7 is a flowchart of an exemplary method and process for splitting and encoding a full monoscopic or stereoscopic panoramic video frame, thereby converting the video frame into a bunch frame set.

FIG. 7 is a flowchart of an exemplary method and process for splitting and encoding a full monoscopic or stereoscopic panoramic video frame, thereby converting the video frame into a bunch frame set. FIG. 7 shows an embodiment of the method and process utilized by an encoding module 200. The stitching module 201 converts a separate video feed from each video capture device into one monoscopic or stereoscopic panoramic video stream (full frame). Each video capture device being associated with a corresponding camera of a camera set. The encoding module 200 splits the full frame into a plurality of pieces 203, the shape and number of which are variable based on the desired configuration. Each split piece of the full frame is temporarily recorded in a storage device assembly 204. In a parallel process, a plurality of encoders encode each split piece of the full frame in a plurality of resolution qualities [(QL1) . . . (QLM)] 205 represented quantitatively in the form of a bitrate. After encoding 205 the plurality of resolution qualities (represented quantitatively in the form of a bitrate) of each split piece is combined into a video bunch frame set 206. The bunch frame set consists of two types of split frames, Intra Frames (Key Frames) and Predicted Frames (Delta Frames). The video bunch frame stream consists of a combination of Intra and Predicted Frames (IPPPIPPPI . . . ).

Figure 8:
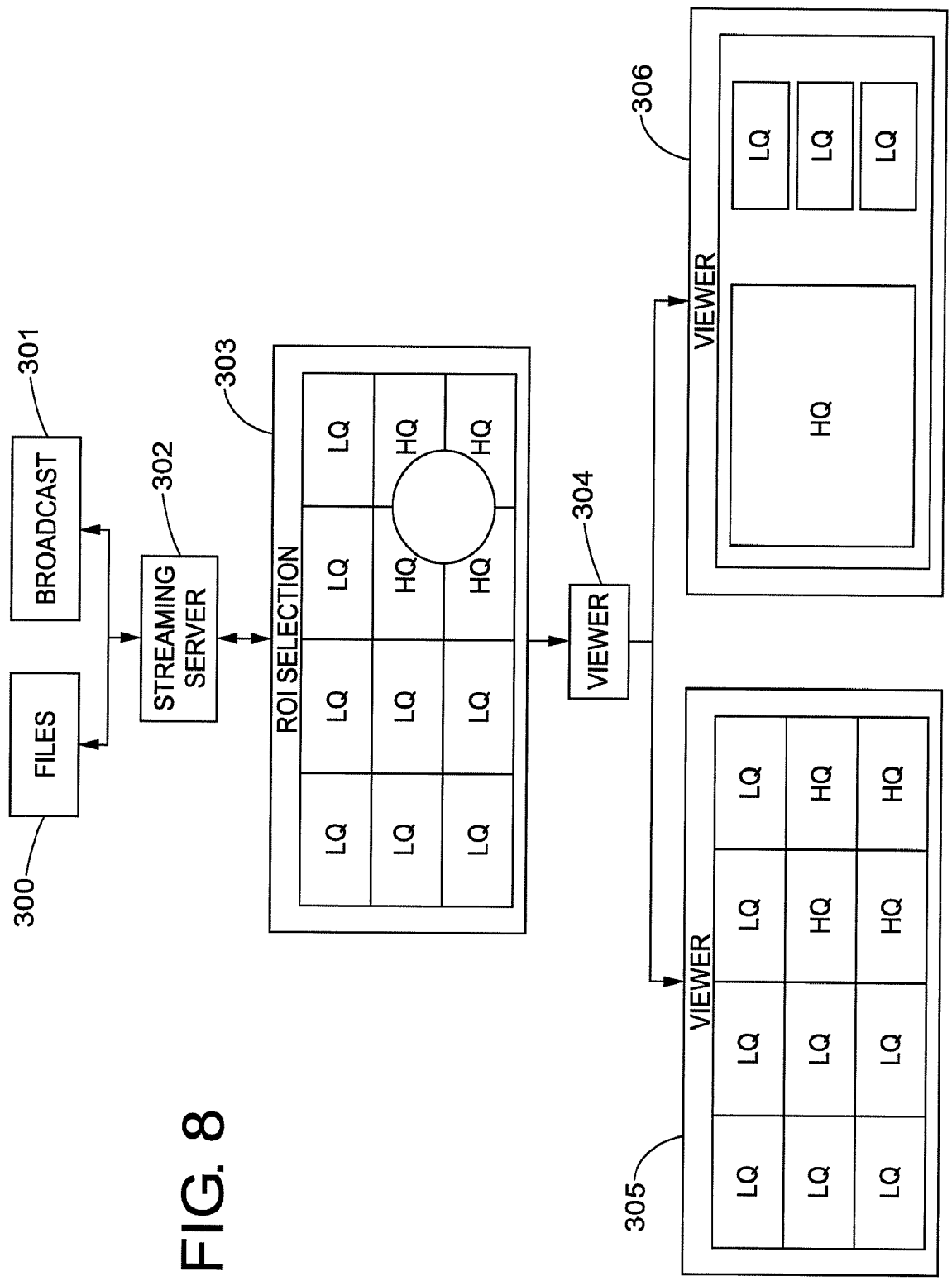
FIG. 8 is a flowchart of an exemplary method and process for identifying, streaming, and displaying monoscopic or stereoscopic panoramic video bunch frames, consisting of Intra Frames (Key Frames) and Predicted Frames (Delta Frames), as determined by the Region of Interest (ROI) selected by the viewer client device or displayed separately in a viewer client device.

FIG. 8 is a flowchart of an exemplary method and process for identifying, streaming, and displaying monoscopic or stereoscopic video bunch frames, consisting of Intra Frames (Key Frames) and Predicted Frames (Delta Frames), as determined by the Region of Interest (ROI) selected by the viewer client device or displayed separately in a viewer client device. In this embodiment, monoscopic or stereoscopic panoramic video bunch frames are streamed from a storage device assembly 300 or a broadcast module 301. The memory and broadcast modules contain a video bunch frame set, which includes the plurality of resolution qualities for each split frame piece. The embodiment in FIG. 8 only shows two resolution qualities, low quality (LQ) and high quality (HQ), while other embodiments utilize a plurality of resolution qualities [(QL1) . . . (QLM)] represented quantitatively in the form of a bitrate. The bunch frame set consists of two types of split frames, Intra Frames (Key Frames) and Predicted Frames (Delta Frames). The video bunch frame stream consists of a combination of Intra and Predicted frames (IPPPIPPPI . . . ).

The streaming server assembly 302 receives the video bunch frame stream from the memory 300 and broadcast 301 modules. The viewer client device 304 connects to the streaming server assembly 302 and, after the connection is established, sends ROI coordinates to the streaming server assembly. The ROI coordinates are based on the Intra Frames that are positioned in the region of interest of the viewer client device 303. Based on the ROI coordinates received from the viewer client device and the current frame status (Intra Frame or Predicted Frame), the streaming server assembly selects and assembles a unique set of pieces with the necessary resolution qualities (represented quantitatively in the form of a bitrate) to form a corresponding unique video bunch frame stream, which is sent to the viewer client device for display 304. This process results in high quality frame pieces being displayed in the region of interest of the viewer client device, while low quality frame pieces are sent for areas outside of the region of interest. When the region of interest moves within the full frame, the streaming server assembly adjusts the unique video bunch frame stream sent to the viewer client device based on new ROI coordinates and the current frame status in real time.

In this embodiment, the frame pieces are displayed in the viewer client device based on application. The frame pieces can be assembled into a full monoscopic or stereoscopic panoramic video 305 or can be displayed separately from each other 306. The separated display 306 may be used in applications in which there is no need for stitching and an independent video stream is produced from each source camera.

Figure 9:
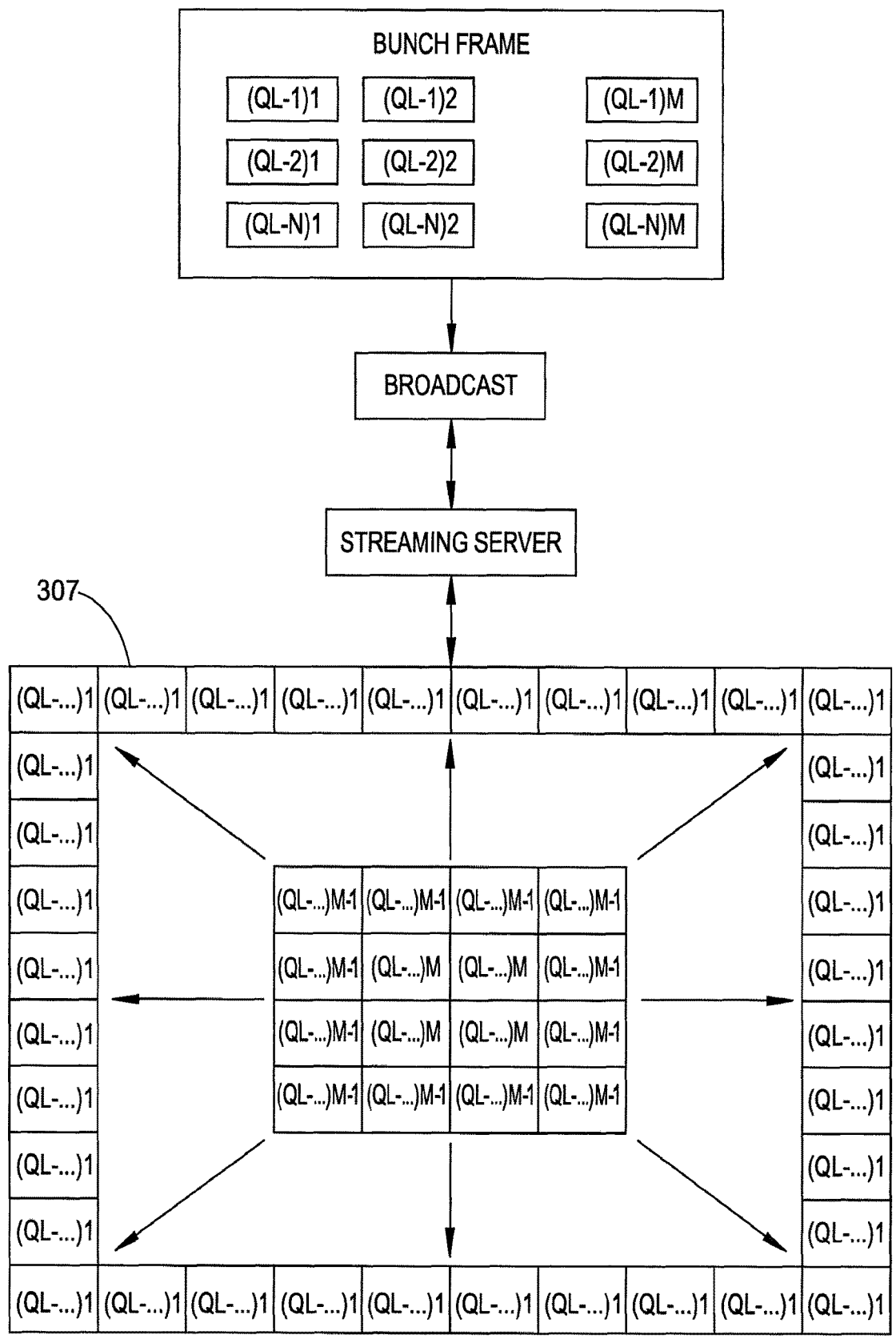
FIG. 9 is a flowchart of an exemplary method, process, and system for streaming and displaying monoscopic or stereoscopic panoramic video bunch frames when M levels of bunch frames are utilized.

FIG. 9 is a flowchart of an exemplary method, process, and system for streaming and displaying monoscopic or stereoscopic panoramic video bunch frames when (QL1) . . . (QLM) quality levels of bunch frames are utilized. FIG. 9 shows an embodiment of FIG. 8 that illustrates the video bunch frame stream containing a plurality of resolution qualities represented quantitatively in the form of a bitrate for each split frame.

Figure 10:
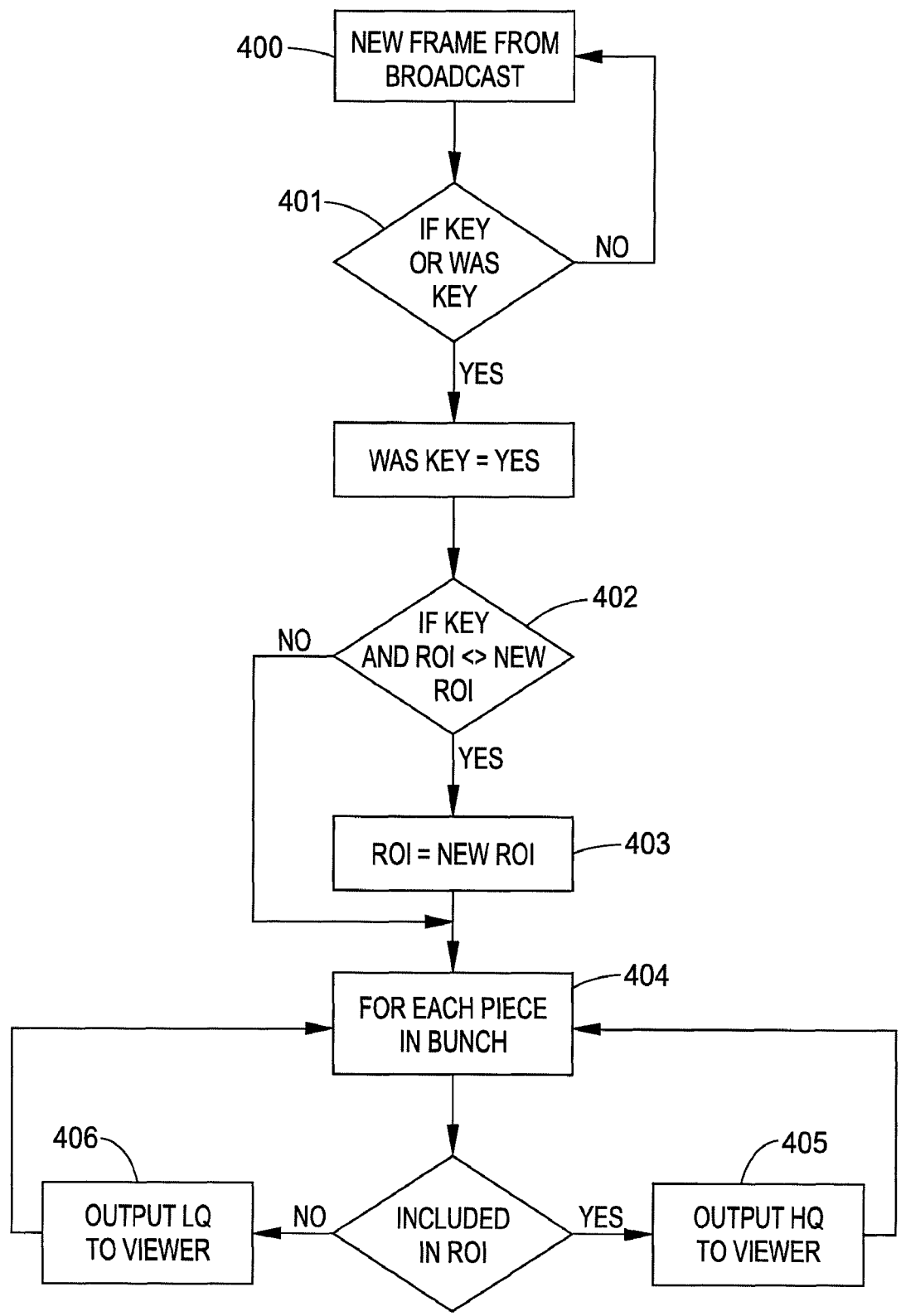
FIG. 10 is a flowchart of an exemplary method, process, and system for identifying and streaming a monoscopic or stereoscopic panoramic video bunch frame set, consisting of a particular combination of Intra Frames (Key Frames) and Predicted Frames (Delta Frames), as determined by the Region of Interest selected by the viewer client device.

FIG. 10 is a flowchart of an exemplary method, process, and system for identifying and streaming a monoscopic or stereoscopic video bunch frame set, consisting of a particular combination of Intra Frames (Key Frames) and Predicted Frames (Delta Frames), as determined by the Region of Interest selected by the viewer client device. The current embodiment explains the process accounting for changes in the resolution qualities (represented quantitatively in the form of a bitrate) of frame pieces comprising the unique video bunch frame stream for the viewer client device, i.e. when the Region of Interest of the viewer client device changes, the composition of the frame pieces comprising the unique video bunch frame stream changes based on new ROI coordinates and on the current Intra Frame (Key Frame) so that high quality frame pieces are displayed in the region of interest of the viewer client device.

While streaming a monoscopic or stereoscopic video, the streaming server assembly receives new frame bunch data from the broadcast module 400. When receiving new frame data, the streaming server assembly checks to see if an Intra Frame (Key Frame) is received 401. The streaming server assembly skips new frame data until an Intra Frame (Key Frame) is received 401. If an Intra Frame (Key Frame) is received and the ROI coordinates of the viewer client device did not change, then the frame quality output does not change 402. If an Intra Frame (Key Frame) is received and the ROI coordinates received from the viewer client device have changed, then the frame quality output is changed by the streaming server assembly 403. Each split frame piece in the video frame bunch is checked 404. If a split frame piece is located inside the ROI, the video bunch frame stream output to the viewer client device is the high bitrate version of the split frame piece 405. If a split frame piece is located outside the ROI, the video bunch frame stream output to the viewer client device is the low bitrate version of the split frame piece 406.

Figure 11:
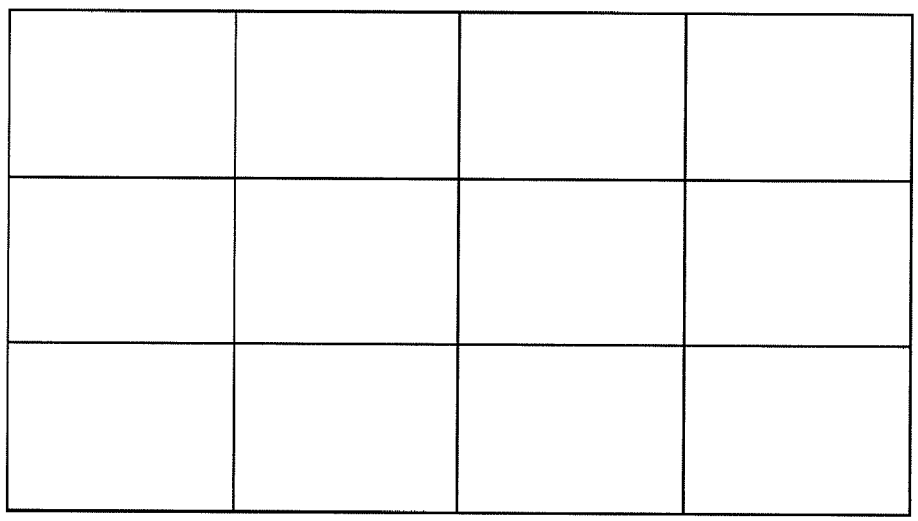
FIG. 11 is an illustration of an exemplary method for splitting a full frame monoscopic or stereoscopic panoramic video file into bunch frame pieces, the size and number of which are variable based on application.
Figure 11:
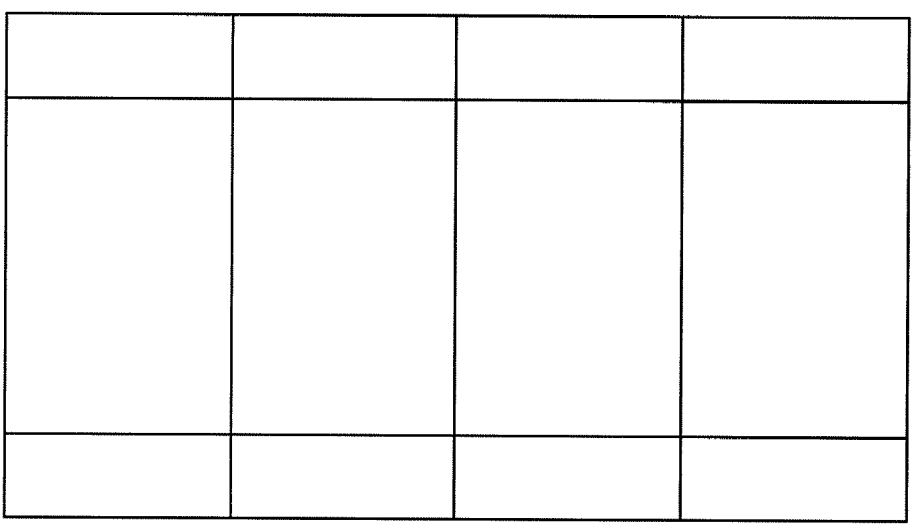
Figure 11:
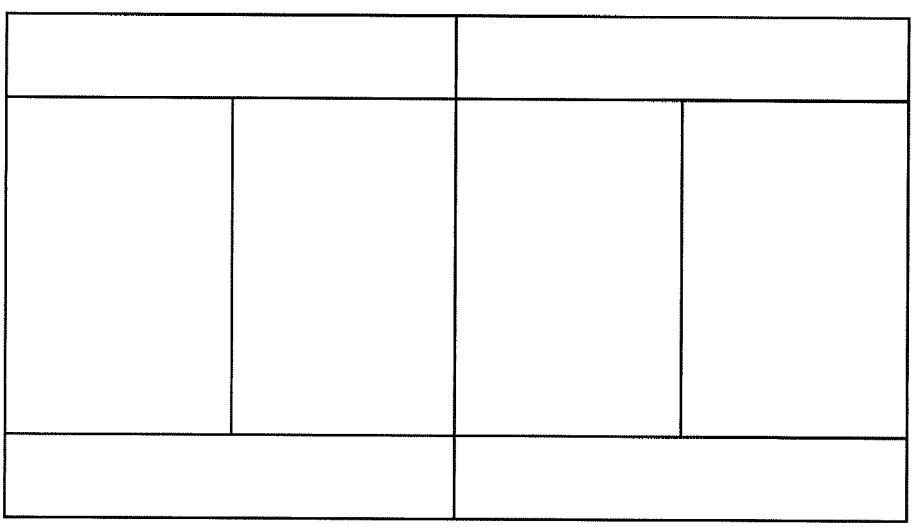

FIG. 11 is an illustration of an exemplary method for splitting a full frame monoscopic or stereoscopic panoramic video file into split frame pieces, the size and number of which are variable based on application. FIG. 11 provides examples of how a monoscopic or stereoscopic panoramic video stream can be partitioned into split frame pieces during the encoding process. The shape and number of pieces that are used to comprise a final video bunch frame during the encoding process are variable and based on application, e.g., video content that is expected to create an elongated, left to right ROI for the viewer client device, may be portioned in horizontal segments.

Figure 12:
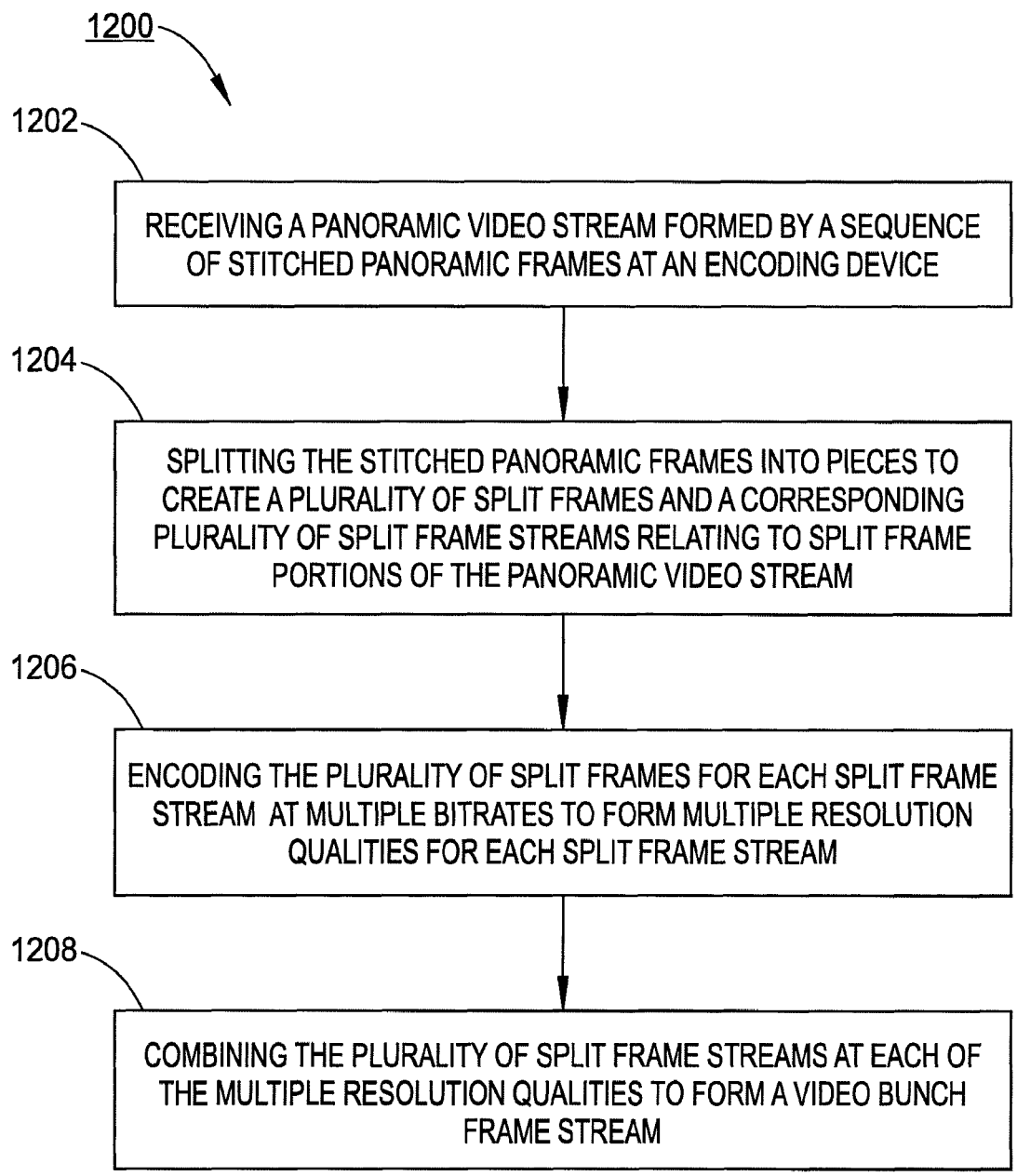
FIG. 12 is a flow chart of an exemplary embodiment of a process for streaming panoramic video.

With reference to FIG. 12, an exemplary embodiment of a process 1200 for streaming panoramic video begins at 1202 where a panoramic video stream formed by a sequence of stitched panoramic frames is received at an encoding device. Each stitched panoramic frame is representative of a panoramic view defined by horizontal and vertical dimensions in relation to a central viewing point. At 1204, the stitched panoramic frames are split into pieces to create a plurality of split frames and a corresponding plurality of split frame streams relating to split frame portions of the panoramic video stream. Next, the plurality of split frames for each split frame stream are encoded at multiple bitrates to form multiple resolution qualities for each split frame stream (1206). The multiple resolution qualities range from a highest resolution quality to a lowest resolution quality. At 1208, the plurality of split frame streams at each of the multiple resolution qualities are combined to form a video bunch frame stream.

In another embodiment of the process 1200, the horizontal dimension associated with the panoramic view is 180 degrees and the vertical dimension associated with the panoramic view is 90 degrees. In yet another embodiment of the process 1200, the panoramic video stream formed by the sequence of stitched panoramic frames is an equirectangular video stream formed by a sequence of stitched equirectangular frames, the horizontal dimension associated with the panoramic view is 360 degrees, and the vertical dimension associated with the panoramic view is 180 degrees. In still another embodiment of the process 1200, the pieces into which the stitched panoramic frames are split are defined by a predetermined configuration such that each piece is identifiable by its position within the stitched panoramic frame and such that the predetermined configuration is consistent from frame-to-frame for the panoramic video stream. In this embodiment, the predetermined configuration for pieces of the stitched panoramic frames includes shape and size parameters for each split frame in a manner that permits split frames at different positions in the stitched panoramic frames to have different shapes and different sizes. In still yet another embodiment of the process 1200, the multiple bitrates for each split frame include at least three bitrates such that the multiple resolution qualities for each split frame stream include a high resolution quality, at least one intermediate resolution quality, and a low resolution quality.

Figure 13:
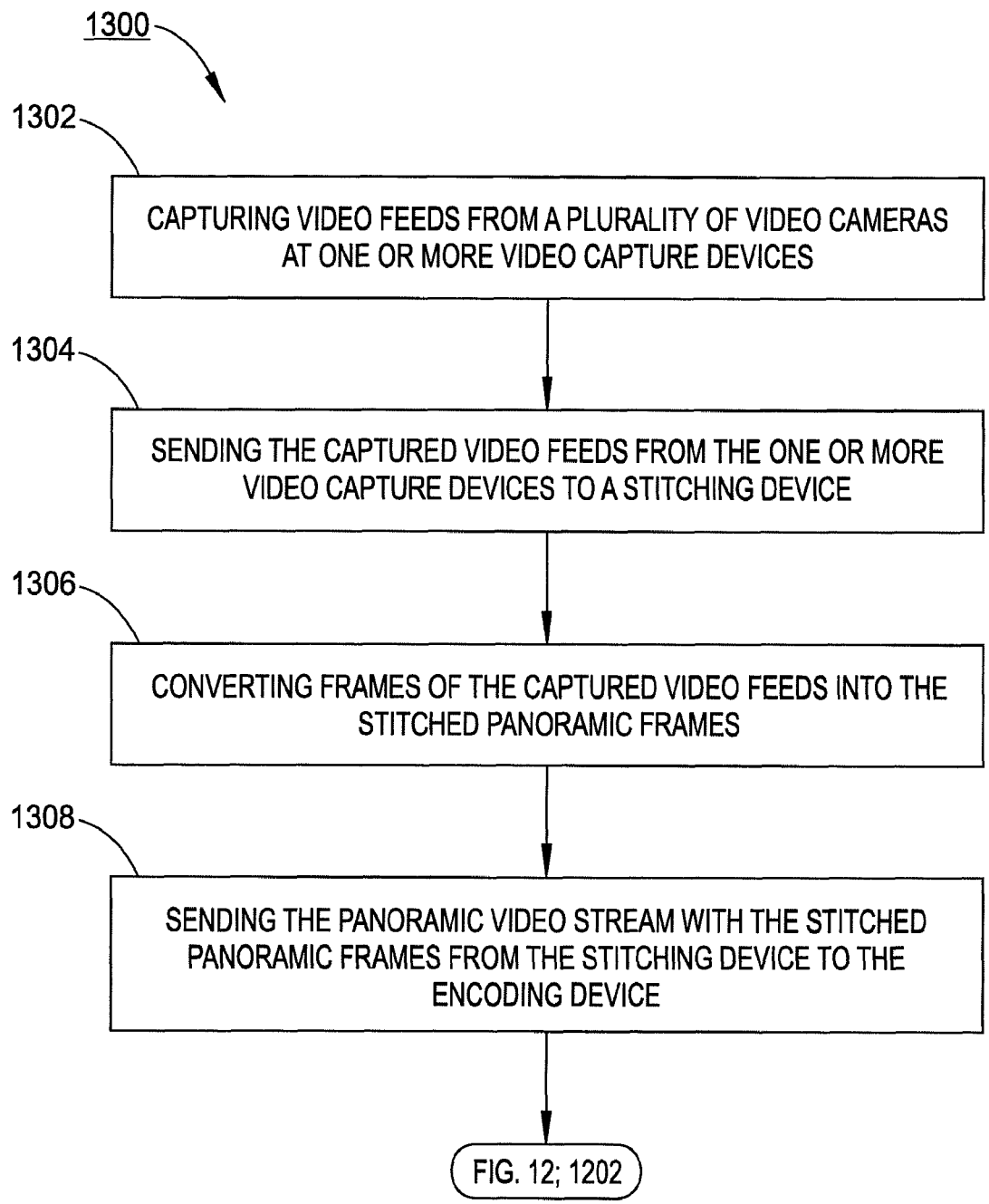
FIG. 13, in combination with FIG. 12, provide a flow chart of another exemplary embodiment of a process for streaming panoramic video.

With reference to FIGS. 12 and 13, an embodiment of a process 1300 for streaming panoramic video begins at 1302 where video feeds from a plurality of video cameras are captured at one or more video capture devices. Fields of view associated with the plurality of video cameras are such that combination of the fields of view provides coverage of the horizontal and vertical dimensions associated with the panoramic view as well as coverage of a corresponding inner surface view of a sphere where the central viewing point relates to a central point of the sphere. At 1304, the captured video feeds are sent from the one or more video capture devices to a stitching device. Next, frames of the captured video feeds are converted into the stitched panoramic frames (1306). At 1308, the panoramic video stream with the stitched panoramic frames are sent from the stitching device to the encoding device. From 1308, the process 1300 continues to 1202 of the process 1200 in FIG. 12.

Figure 14:
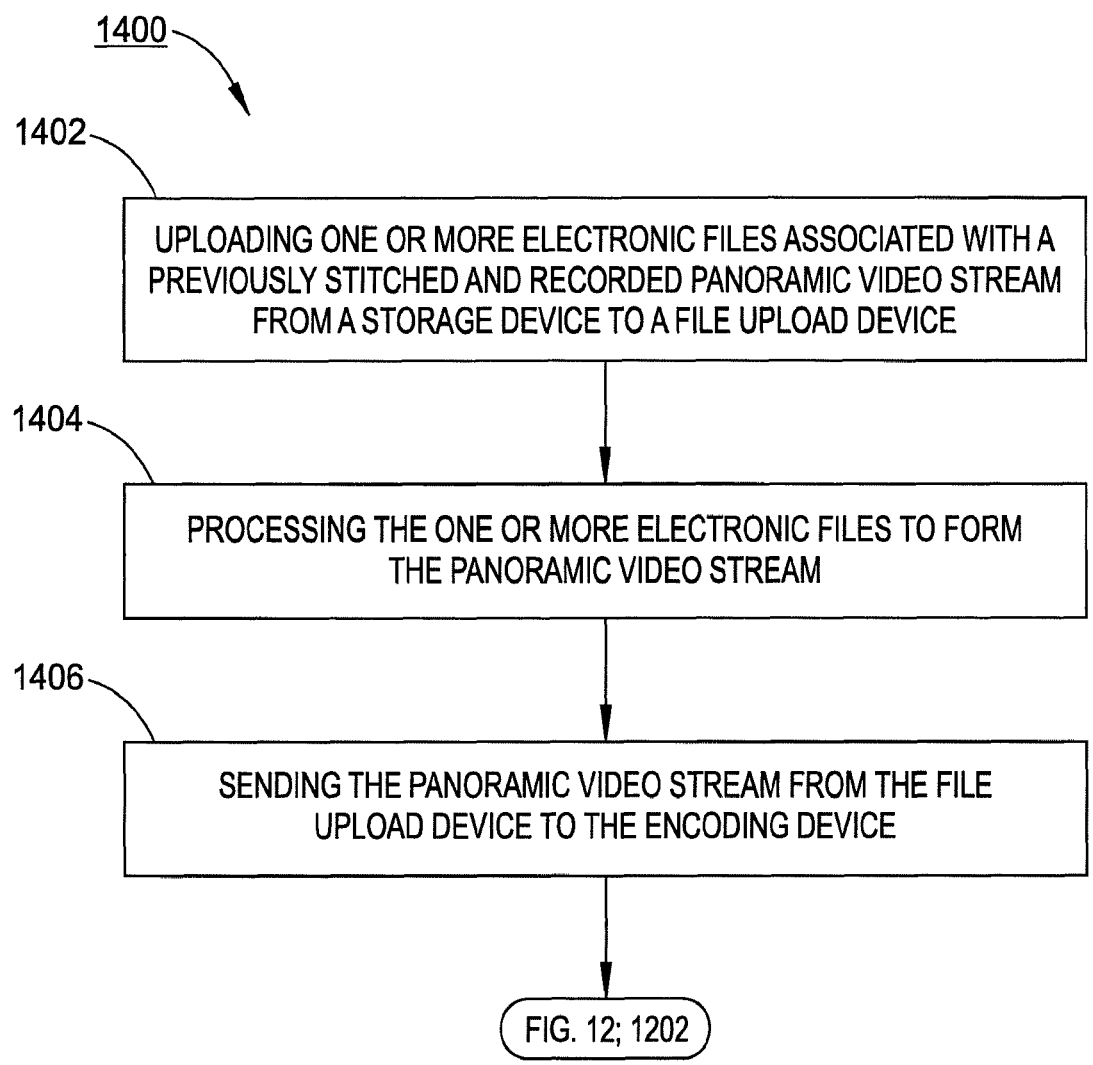
FIG. 14, in combination with FIG. 12, provide a flow chart of yet another exemplary embodiment of a process for streaming panoramic video.

With reference to FIGS. 12 and 14, an embodiment of a process 1400 for streaming panoramic video begins at 1402 where one or more electronic files associated with a previously stitched and recorded panoramic video stream are uploaded from a storage device to a file upload device. The previously stitched and recorded panoramic video includes the stitched panoramic frames of the panoramic video stream. At 1404, the one or more electronic files are processed to form the panoramic video stream. Next, the panoramic video stream is sent from the file upload device to the encoding device (1406). From 1406, the process 1400 continues to 1202 of the process 1200 in FIG. 12.

Figure 15:
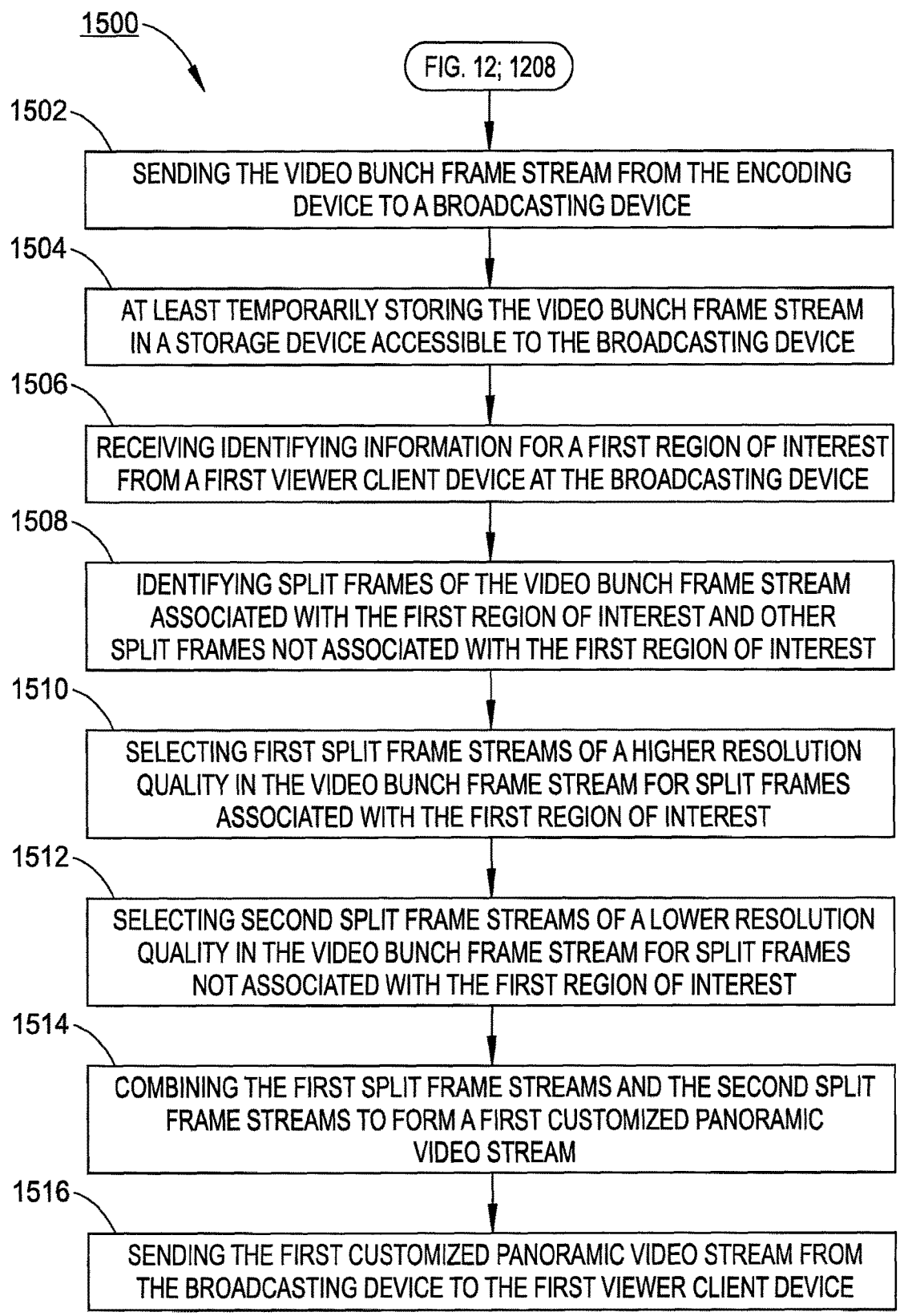
FIG. 15, in combination with FIG. 12, provide a flow chart of still another exemplary embodiment of a process for streaming panoramic video.

With reference to FIGS. 12 and 15, an embodiment of a process 1500 for streaming panoramic video includes the process 1200 of FIG. 12 and continues from 1208 to 1502 where the video bunch frame stream is sent from the encoding device to a broadcasting device. At 1504, the video bunch frame stream is at least temporarily stored in a storage device accessible to the broadcasting device. Next, identifying information for a first region of interest is received from a first viewer client device at the broadcasting device (1506). The first region of interest is representative of at least a first portion of the panoramic view. At 1508, split frames of the video bunch frame stream associated with the first region of interest and other split frames not associated with the first region of interest are identified. Next, first split frame streams of a higher resolution quality in the video bunch frame stream are selected for split frames associated with the first region of interest (1510). At 1512, second split frame streams of a lower resolution quality in the video bunch frame stream are selected for split frames not associated with the first region of interest. Next, the first split frame streams and the second split frame streams are combined to form a first customized panoramic video stream (1514). At 1516, the first customized panoramic video stream is sent from the broadcasting device to the first viewer client device.

In another embodiment, the process 1500 also includes receiving identifying information for a second region of interest from a second viewer client device at the broadcasting device. The second region of interest is different from the first region of interest and representative of at least a second portion of the panoramic view. Split frames of the video bunch frame stream associated with the second region of interest and other split frames not associated with the second region of interest are identified. Third split frame streams of a higher resolution quality in the video bunch frame stream are selected for split frames associated with the second region of interest. Fourth split frame streams of a lower resolution quality in the video bunch frame stream are selected for split frames not associated with the second region of interest. The third split frame streams and the fourth split frame streams are combined to form a second customized panoramic video stream. The second customized panoramic video stream is sent from the broadcasting device to the second viewer client device.

Figure 16:
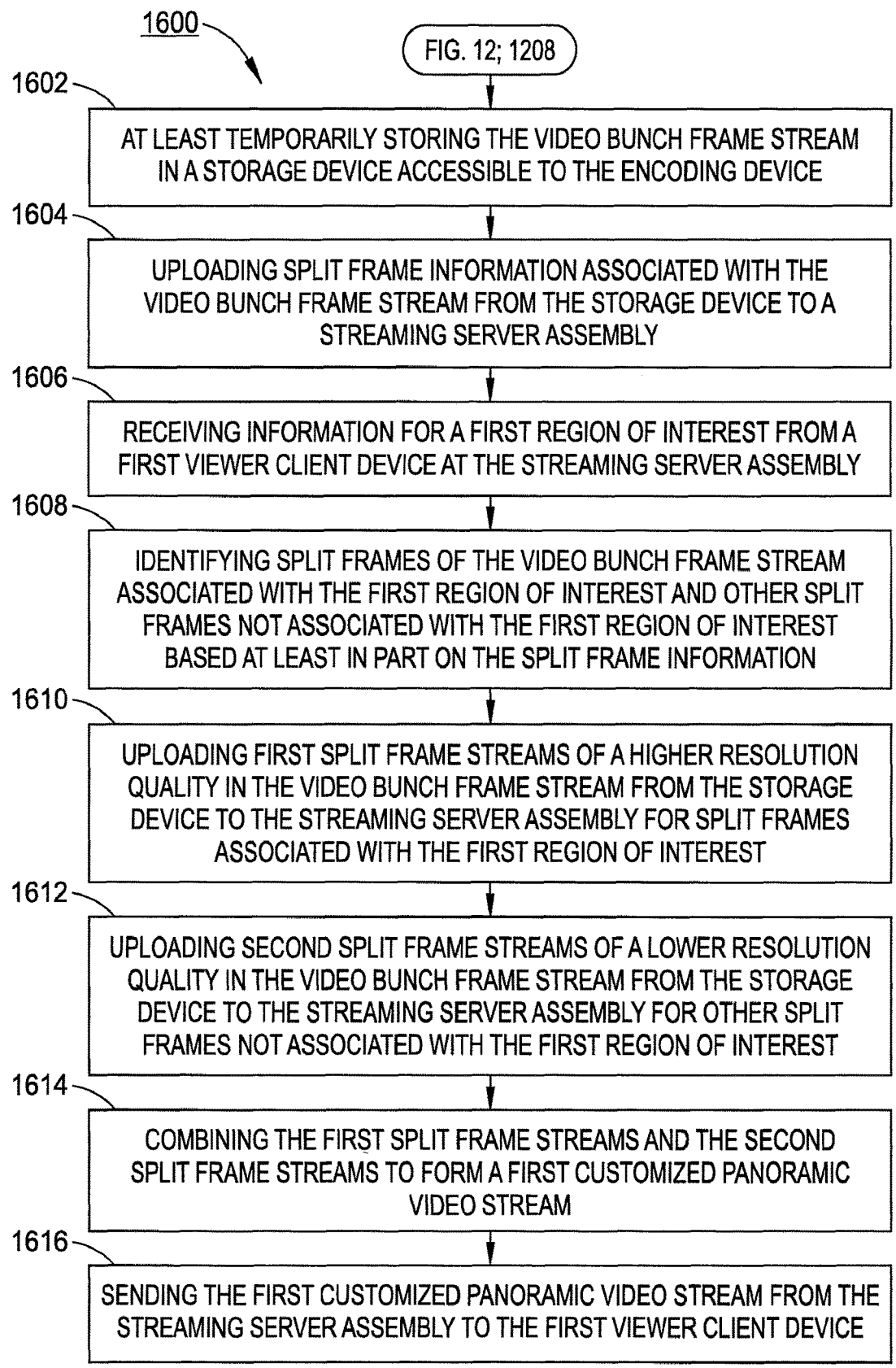
FIG. 16, in combination with FIG. 12, provide a flow chart of still yet another exemplary embodiment of a process for streaming panoramic video.

With reference to FIGS. 12 and 16, an embodiment of a process 1600 for streaming panoramic video includes the process 1200 of FIG. 12 and continues from 1208 to 1602 where the video bunch frame stream is at least temporarily stored in a storage device accessible to the encoding device. At 1604, split frame information associated with the video bunch frame stream is uploaded from the storage device to a streaming server assembly. Next, identifying information for a first region of interest is received from a first viewer client device at the streaming server assembly (1606). The first region of interest is representative of at least a first portion of the panoramic view. At 1608, split frames of the video bunch frame stream associated with the first region of interest and other split frames not associated with the first region of interest based at least in part on the split frame information are identified. Next, first split frame streams of a higher resolution quality in the video bunch frame stream are uploaded from the storage device to the streaming server assembly for split frames associated with the first region of interest (1610). At 1612, second split frame streams of a lower resolution quality in the video bunch frame stream are uploaded from the storage device to the streaming server assembly for other split frames not associated with the first region of interest. Next, the first split frame streams and the second split frame streams are combined to form a first customized panoramic video stream (1614). At 1616, the first customized panoramic video stream is sent from the streaming server assembly to the first viewer client device.

In another embodiment, the process 1600 also includes receiving identifying information for a second region of interest from a second viewer client device at the streaming server assembly. The second region of interest is representative of at least a second portion of the panoramic view. Split frames of the video bunch frame stream associated with the second region of interest and other split frames not associated with the second region of interest based at least in part on the split frame information are identified. Third split frame streams of a higher resolution quality in the video bunch frame stream are uploaded from the storage device to the streaming server assembly for split frames associated with the second region of interest. Fourth split frame streams of a lower resolution quality in the video bunch frame stream are uploaded from the storage device to the streaming server assembly for other split frames not associated with the second region of interest. The third split frame streams and the fourth split frame streams are combined to form a second customized panoramic video stream. The second customized panoramic video stream is sent from the streaming server assembly to the second viewer client device.

Figure 17:
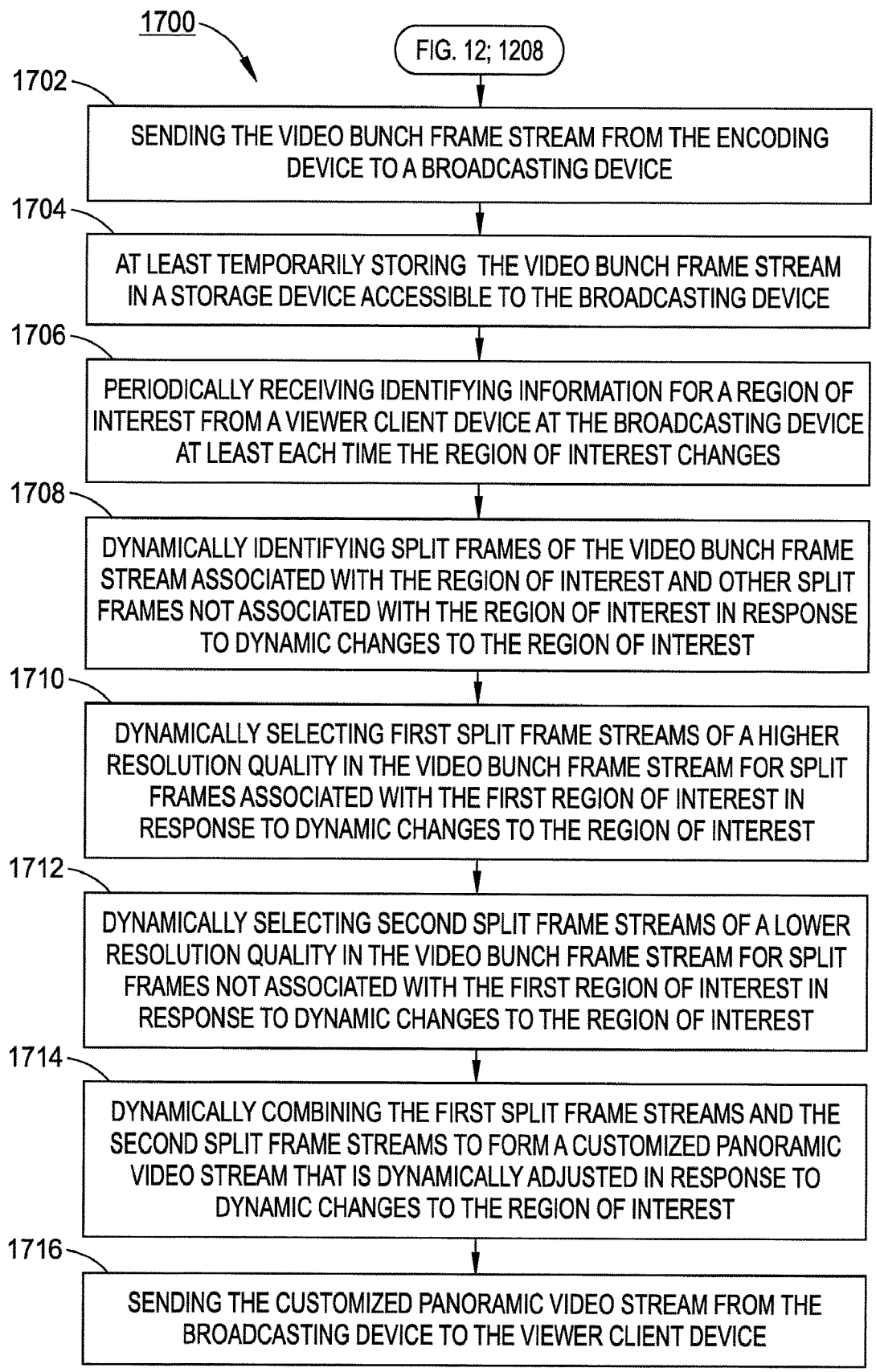
FIG. 17, in combination with FIG. 12, provide a flow chart of another exemplary embodiment of a process for streaming panoramic video.

With reference to FIGS. 12 and 17, an embodiment of a process 1700 for streaming panoramic video includes the process 1200 of FIG. 12 and continues from 1208 to 1702 where the video bunch frame stream is sent from the encoding device to a broadcasting device. At 1704, the video bunch frame stream is at least temporarily stored in a storage device accessible to the broadcasting device. Next, identifying information for a region of interest is periodically received from a viewer client device at the broadcasting device at least each time the region of interest changes (1706). The viewer client device is configured to permit the region of interest to dynamically change in response to user actions at the viewer client device associated with streaming video displayed on the viewer client device. The region of interest is representative of at least a portion of the panoramic view. At 1708, split frames of the video bunch frame stream associated with the region of interest and other split frames not associated with the region of interest are dynamically identified in response to dynamic changes to the region of interest. Next, first split frame streams of a higher resolution quality in the video bunch frame stream are dynamically selected for split frames associated with the first region of interest in response to dynamic changes to the region of interest (1710). At 1712, second split frame streams of a lower resolution quality in the video bunch frame stream are dynamically selected for split frames not associated with the first region of interest in response to dynamic changes to the region of interest. Next, the first split frame streams and the second split frame streams are dynamically combined to form a customized panoramic video stream that is dynamically adjusted in response to dynamic changes to the region of interest (1714). At 1716, the customized panoramic video stream is sent from the broadcasting device to the viewer client device.

Figure 18B:
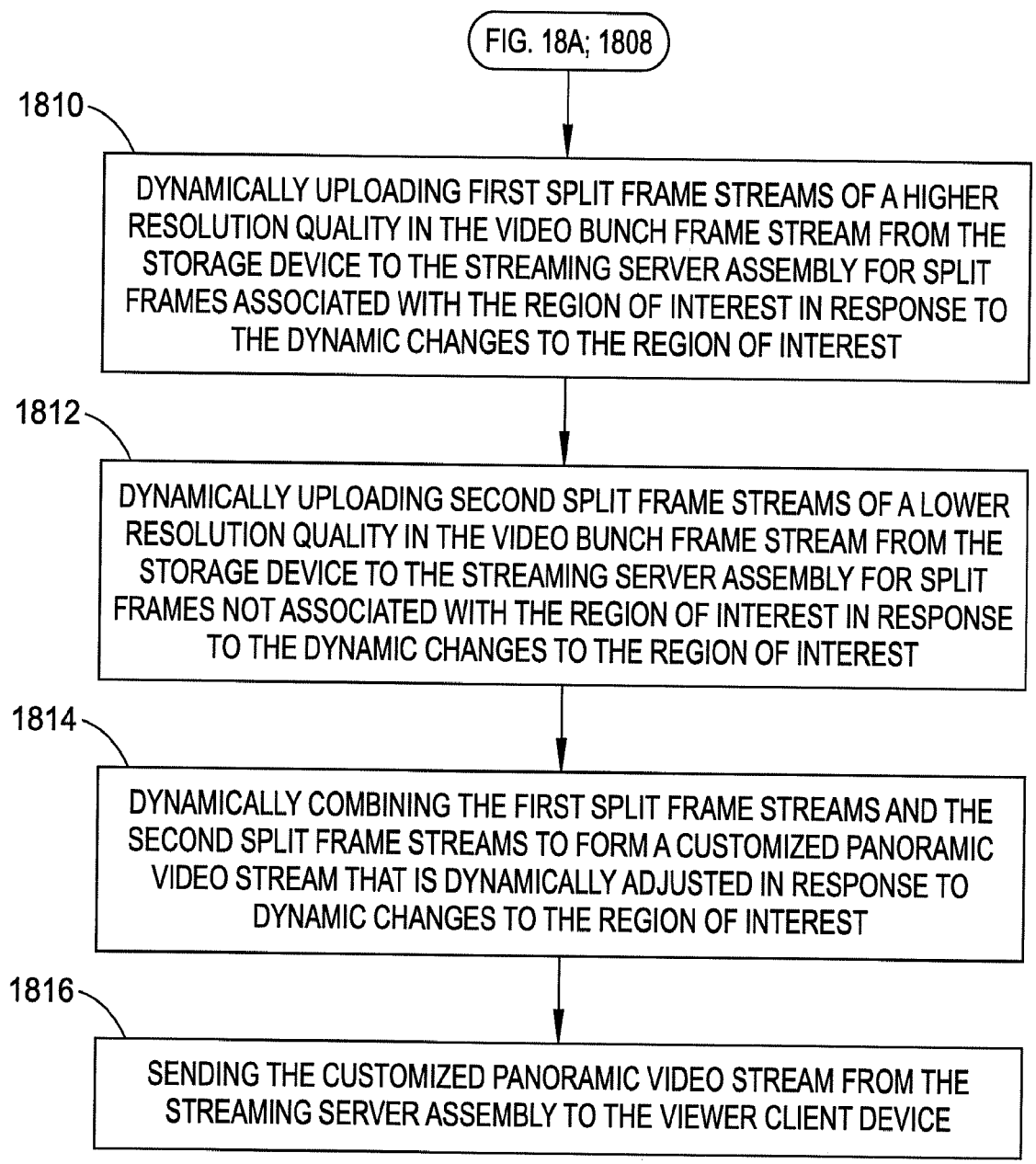

With reference to FIGS. 12, 18A, and 18B, an embodiment of a process 1800 for streaming panoramic video includes the process 1200 of FIG. 12 and continues from 1208 to 1802 where the video bunch frame stream is at least temporarily stored in a storage device accessible to the encoding device. At 1804, split frame information associated with the video bunch frame stream is uploaded from the storage device to a streaming server assembly. Next, identifying information for a region of interest is periodically received from a viewer client device at the streaming server assembly at least each time the region of interest changes (1806). The viewer client device is configured to permit the region of interest to dynamically change in response to user actions at the viewer client device associated with streaming video displayed on the viewer client device. The region of interest is representative of at least a portion of the panoramic view. Next, split frames of the video bunch frame stream associated with the region of interest and other split frames not associated with the region of interest based at least in part on the split frame information are dynamically identified in response to dynamic changes to the region of interest (1808). At 1810, first split frame streams of a higher resolution quality in the video bunch frame stream are dynamically uploaded from the storage device to the streaming server assembly for split frames associated with the region of interest in response to the dynamic changes to the region of interest. Next, second split fame streams of a lower resolution quality in the video bunch frame stream are dynamically uploaded from the storage device to the streaming server assembly for other split frames not associated with the region of interest in response to the dynamic changes to the region of interest (1812). At 1814, the first split frame streams and the second split frame streams are dynamically combined to form a customized panoramic video stream that is dynamically adjusted in response to dynamic changes to the region of interest. Next, the customized panoramic video stream is sent from the streaming server assembly to the viewer client device.

Figure 19:
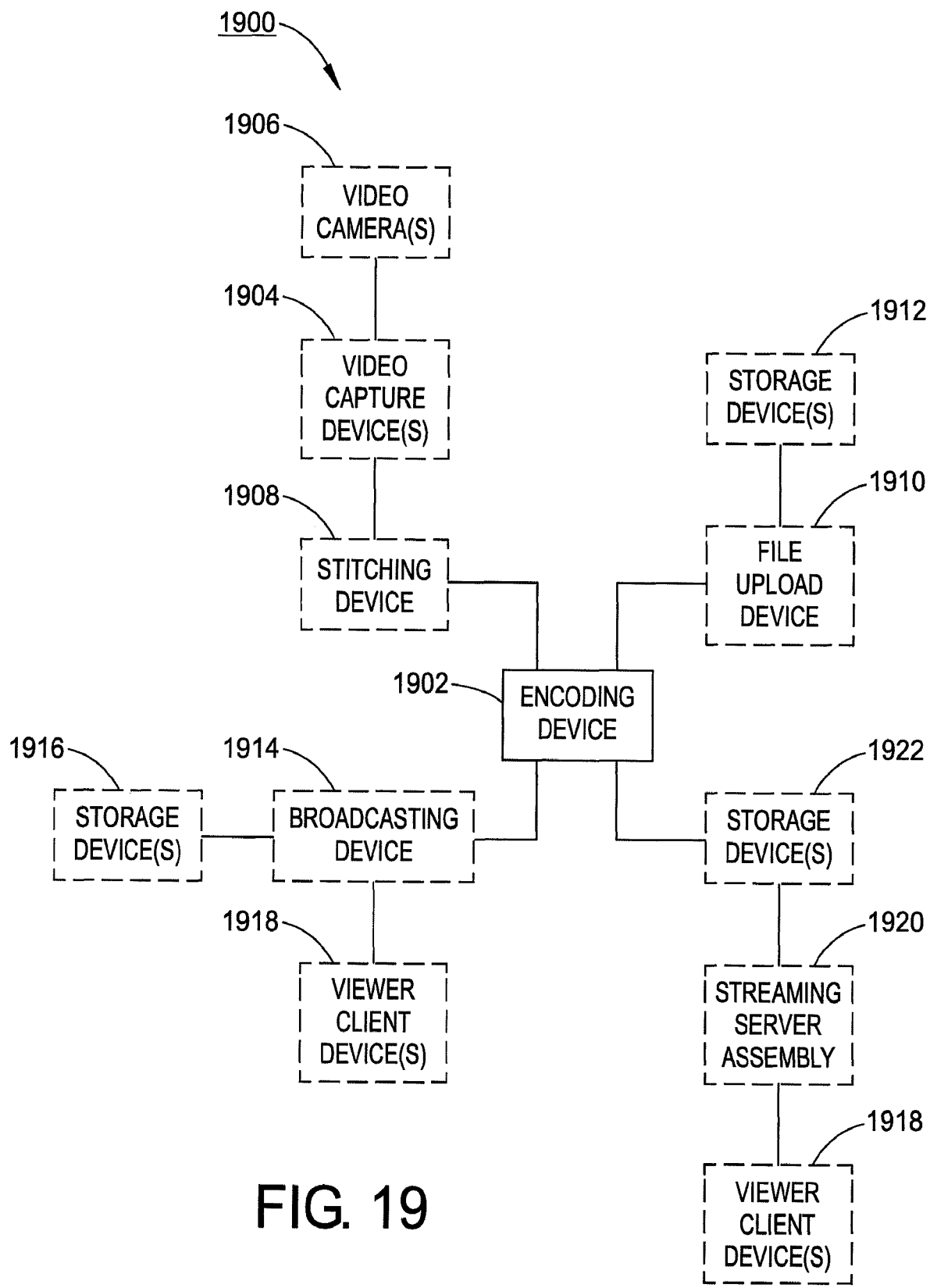
FIG. 19 is a block diagram of an exemplary embodiment of a system configured to stream panoramic video.

With reference to FIG. 19, an exemplary embodiment of a system 1900 for streaming panoramic video includes an encoding device 1902 configured to receive a panoramic video stream formed by a sequence of stitched panoramic frames. Each stitched panoramic frame is representative of a panoramic view defined by horizontal and vertical dimensions in relation to a central viewing point. The encoding device 1902 is configured to split the stitched panoramic frames into pieces to create a plurality of split frames and a corresponding plurality of split frame streams relating to split frame portions of the panoramic video stream. The encoding device 1902 is configured to encode the plurality of split frames for each split frame stream at multiple bitrates to form multiple resolution qualities for each split frame stream. The multiple resolution qualities range from a highest resolution quality to a lowest resolution quality. The encoding device 1902 is configured to combine the plurality of split frame streams at each of the multiple resolution qualities to form a video bunch frame stream.

In another embodiment, the system 1900 includes one or more video capture devices 1904, a plurality of video cameras 1906, and a stitching device 1908. The one or more video capture devices 1904 are configured to capture video feeds from the plurality of video cameras 1906. Fields of view associated with the plurality of video cameras 1906 are such that combination of the fields of view provides coverage of the horizontal and vertical dimensions associated with the panoramic view as well as coverage of a corresponding inner surface view of a sphere where the central viewing point relates to a central point of the sphere. The one or more video capture devices 1904 are configured to send the captured video feeds to the stitching device 1908. The stitching device 1908 is configured to convert frames of the captured video feeds into the stitched panoramic frames. The stitching device 1908 is configured to send the panoramic video stream with the stitched panoramic frames to the encoding device 1902.

In yet another embodiment, the system 1900 includes a file upload device 1910 configured to upload one or more electronic files associated with a previously stitched and recorded panoramic video stream from a storage device 1912. The previously stitched and recorded panoramic video includes the stitched panoramic frames of the panoramic video stream. The file upload device 1910 is configured to process the one or more electronic files to form the panoramic video stream. The file upload device 1910 is configured to send the panoramic video stream to the encoding device 1902.

In still another embodiment, the system 1900 includes a broadcasting device 1914. In this embodiment, the encoding device 1902 is configured to send the video bunch frame stream to the broadcasting device 1914. The broadcasting device 1914 is configured to at least temporarily store the video bunch frame stream in a storage device 1916. The broadcasting device 1914 is configured to receive identifying information for a first region of interest from a first viewer client device 1918. The first region of interest is representative of at least a first portion of the panoramic view. The broadcasting device 1914 is configured to identify split frames of the video bunch frame stream associated with the first region of interest and other split frames not associated with the first region of interest. The broadcasting device 1914 is configured to select first split frame streams of a higher resolution quality in the video bunch frame stream for split frames associated with the first region of interest. The broadcasting device 1914 is configured to select second split frame streams of a lower resolution quality in the video bunch frame stream for split frames not associated with the first region of interest. The broadcasting device 1914 is configured to combine the first split frame streams and the second split frame streams to form a first customized panoramic video stream. The broadcasting device 1914 is configured to send the first customized panoramic video stream to the first viewer client device 1918.

In still yet another embodiment, the system 1900 includes a streaming server assembly 1920. In this embodiment, the encoding device 1902 is configured to at least temporarily store the video bunch frame stream in a storage device 1922. The streaming server assembly 1920 is configured to upload split frame information associated with the video bunch frame stream from the storage device 1922. The streaming server assembly 1920 is configured to receive identifying information for a first region of interest from a first viewer client device 1918. The first region of interest is representative of at least a first portion of the panoramic view. The streaming server assembly 1920 is configured to identify split frames of the video bunch frame stream associated with the first region of interest and other split frames not associated with the first region of interest based at least in part on the split frame information. The streaming server assembly 1920 is configured to upload first split frame streams of a higher resolution quality in the video bunch frame stream from the storage device 1922 for split frames associated with the first region of interest. The streaming server assembly 1920 is configured to upload second split frame streams of a lower resolution quality in the video bunch frame stream from the storage device 1922 for other split frames not associated with the first region of interest. The streaming server assembly 1920 is configured to combine the first split frame streams and the second split frame streams to form a first customized panoramic video stream. The streaming server assembly 1920 is configured to send the first customized panoramic video stream to the first viewer client device 1918.

In another embodiment, the system 1900 includes a broadcasting device 1914. In this embodiment, the encoding device 1902 is configured to send the video bunch frame stream to the broadcasting device 1914. The broadcasting device 1914 is configured to at least temporarily store the video bunch frame stream in a storage device 1916. The broadcasting device 1914 is configured to periodically receive identifying information for a region of interest from a viewer client device 1918 at least each time the region of interest changes. The viewer client device 1918 is configured to permit the region of interest to dynamically change in response to user actions at the viewer client device 1918 associated with streaming video displayed on the viewer client device 1918. The region of interest is representative of at least a portion of the panoramic view. The broadcasting device 1914 is configured to dynamically identify split frames of the video bunch frame stream associated with the region of interest and other split frames not associated with the region of interest in response to dynamic changes to the region of interest. The broadcasting device 1914 is configured to dynamically select first split frame streams of a higher resolution quality in the video bunch frame stream for split frames associated with the first region of interest in response to dynamic changes to the region of interest. The broadcasting device 1914 is configured to dynamically select second split frame streams of a lower resolution quality in the video bunch frame stream for split frames not associated with the first region of interest in response to dynamic changes to the region of interest. The broadcasting device 1914 is configured to dynamically combine the first split frame streams and the second split frame streams to form a customized video stream that is dynamically adjusted in response to dynamic changes to the region of interest. The broadcasting device 1914 is configured to send the customized panoramic video stream to the viewer client device 1918.

In another embodiment, the system 1900 includes a streaming server assembly 1920. In this embodiment, the encoding device 1902 is configured to at least temporarily store the video bunch frame stream in a storage device 1922. The streaming server assembly 1920 is configured to upload split frame information associated with the video bunch frame stream from the storage device 1922. The streaming server assembly 1920 is configured to periodically receive identifying information for a region of interest from a viewer client device 1918 at least each time the region of interest changes. The viewer client device 1918 is configured to permit the region of interest to dynamically change in response to user actions at the viewer client device 1918 associated with streaming video displayed on the viewer client device 1918. The region of interest is representative of at least a portion of the panoramic view. The streaming server assembly 1920 is configured to dynamically identify split frames of the video bunch frame stream associated with the region of interest and other split frames not associated with the region of interest based at least in part on the split frame information in response to dynamic changes to the region of interest. The streaming server assembly 1920 is configured to dynamically upload first split frame streams of a higher resolution quality in the video bunch frame stream from the storage device 1922 for split frames associated with the region of interest in response to the dynamic changes to the region of interest. The streaming server assembly 1920 is configured to dynamically upload second split frame streams of a lower resolution quality in the video bunch frame stream from the storage device 1922 for other split frames not associated with the region of interest in response to the dynamic changes to the region of interest. The streaming server assembly 1920 is configured to dynamically combine the first split frame streams and the second split frame streams to form a customized panoramic video stream that is dynamically adjusted in response to dynamic changes to the region of interest. The streaming server assembly 1920 is configured to send the customized panoramic video stream to the viewer client device 1918.

With reference to FIGS. 12-19, various exemplary embodiments of non-transitory computer-readable medium storing program instructions that, when executed by at least one computer or processor cause a corresponding processor-controlled system (e.g., system 1900) to perform a method of streaming panoramic video. For example, various embodiments of the processor-controlled system are described above with reference to FIG. 19. Various embodiments of the method of streaming panoramic video are described above with reference to FIGS. 12-17, 18A, and 18B. In other words, the program instructions of the various exemplary embodiments of non-transitory computer-readable medium are defined by any suitable combination of the processes 1200, 1300, 1400, 1500, 1600, 1700, and 1800 described above with reference to FIGS. 12-17, 18A, and 18B. Similarly, the processor-controlled system 1900 associated with the various exemplary embodiments of non-transitory computer-readable medium are defined by any suitable combination of components described above with reference to FIG. 19.

Numerous additional variations on the various embodiments of methods, processes, and systems described above will be apparent to those skilled in the art in view of the above description. Such variations include presently unforeseen or unanticipated alternatives, modifications, and improvements that may be subsequently made by those skilled in the art and are intended to be within the scope of the methods, processes, and systems described herein.

We claim:
1. A method of streaming panoramic video, comprising:
  receiving a panoramic video stream formed by a sequence of stitched panoramic frames at an encoding device, wherein each stitched panoramic frame is representative of a panoramic view defined by horizontal and vertical dimensions in relation to a central viewing point;
  splitting the stitched panoramic frames into pieces to create a plurality of split frames and a corresponding plurality of split frame streams relating to split frame portions of the panoramic video stream;
  encoding the plurality of split frames for each split frame stream at multiple bitrates to form multiple bitrate encodings corresponding to multiple resolution qualities for each split frame stream, wherein the multiple resolution qualities range from a highest resolution quality to a lowest resolution quality;

combining the multiple bitrate encodings for the plurality of split frame streams to form a video bunch frame stream, wherein the video bunch frame stream includes the multiple bitrate encodings for each split frame stream based on the combining;

combining first split frame streams of a higher resolution quality and second split frame streams of a lower resolution quality to form a customized panoramic video stream from the video bunch frame stream, wherein at least the first split frame streams are selected in response to a region of interest received from a viewer client device, wherein the region of interest is representative of at least a portion of the panoramic view; and sending the customized panoramic video stream to the viewer client device.

2. The method of claim 1, further comprising:

capturing video feeds from a plurality of video cameras at one or more video capture devices, wherein fields of view associated with the plurality of video cameras are such that combination of the fields of view provides coverage of the horizontal and vertical dimensions associated with the panoramic view as well as coverage of a corresponding inner surface view of a sphere where the central viewing point relates to a central point of the sphere;

sending the captured video feeds from the one or more video capture devices to a stitching device;

converting frames of the captured video feeds into the stitched panoramic frames; and sending the panoramic video stream with the stitched panoramic frames from the stitching device to the encoding device.

3. The method of claim 1, further comprising:

uploading one or more electronic files associated with a previously stitched and recorded panoramic video stream from a storage device to a file upload device, wherein the previously stitched and recorded panoramic video includes the stitched panoramic frames of the panoramic video stream;

processing the one or more electronic files to form the panoramic video stream; and sending the panoramic video stream from the file upload device to the encoding device.

4. The method of claim 1, further comprising:

sending the video bunch frame stream from the encoding device to a broadcasting device;

at least temporarily storing the video bunch frame stream in a storage device accessible to the broadcasting device;

receiving identifying information for a second region of interest from a second viewer client device at the broadcasting device, wherein the second region of interest is representative of at least a second portion of the panoramic view;

identifying split frames of the video bunch frame stream associated with the second region of interest and other split frames not associated with the second region of interest;

selecting third split frame streams of a higher resolution quality in the video bunch frame stream for split frames associated with the second region of interest;

selecting fourth split frame streams of a lower resolution quality in the video bunch frame stream for split frames not associated with the second region of interest;

combining the third split frame streams and the fourth split frame streams to form a second customized panoramic video stream; and sending the second customized panoramic video stream from the broadcasting device to the second viewer client device.

5. The method of claim 4, further comprising:

receiving identifying information for a third region of interest from a third viewer client device at the broadcasting device, wherein the third region of interest is different from the second region of interest and representative of at least a third portion of the panoramic view;

identifying split frames of the video bunch frame stream associated with the third region of interest and other split frames not associated with the third region of interest;

selecting fifth split frame streams of a higher resolution quality in the video bunch frame stream for split frames associated with the third region of interest;

selecting sixth split frame streams of a lower resolution quality in the video bunch frame stream for split frames not associated with the third region of interest;

combining the fifth split frame streams and the sixth split frame streams to form a third customized panoramic video stream; and sending the third customized panoramic video stream from the broadcasting device to the third viewer client device.

6. The method of claim 1, further comprising:

at least temporarily storing the video bunch frame stream in a storage device accessible to the encoding device;

uploading split frame information associated with the video bunch frame stream from the storage device to a streaming server assembly;

receiving identifying information for the region of interest from the viewer client device at the streaming server assembly;

identifying split frames of the video bunch frame stream associated with the first region of interest and other split frames not associated with the region of interest based at least in part on the split frame information;

uploading first split frame streams in the video bunch frame stream from the storage device to the streaming server assembly based on the split frames associated with the region of interest; and uploading the second split frame streams in the video bunch frame stream from the storage device to the streaming server assembly based on the other split frames not associated with the region of interest;

wherein the customized panoramic video stream is sent from the streaming server assembly to the first-viewer client device.

7. The method of claim 6, further comprising:

receiving identifying information for a second region of interest from a second viewer client device at the streaming server assembly, wherein the second region of interest is representative of at least a second portion of the panoramic view;

identifying split frames of the video bunch frame stream associated with the second region of interest and other split frames not associated with the second region of interest based at least in part on the split frame information;

uploading third split frame streams of a higher resolution quality in the video bunch frame stream from the storage device to the streaming server assembly based on the split frames associated with the second region of interest;

uploading fourth split frame streams of a lower resolution quality in the video bunch frame stream from the storage device to the streaming server assembly based on other split frames not associated with the second region of interest;

combining the third split frame streams and the fourth split frame streams to form a second customized panoramic video stream; and sending the second customized panoramic video stream from the streaming server assembly to the second viewer client device.

8. The method of claim 1, further comprising:

sending the video bunch frame stream from the encoding device to a broadcasting device;

at least temporarily storing the video bunch frame stream in a storage device accessible to the broadcasting device;

periodically receiving identifying information for a second region of interest from a second viewer client device at the broadcasting device at least each time the second region of interest changes, wherein the second viewer client device is configured to permit the second region of interest to dynamically change in response to user actions at the second viewer client device associated with streaming video displayed on the second viewer client device, wherein the second region of interest is representative of at least a portion of the panoramic view;

dynamically identifying split frames of the video bunch frame stream associated with the second region of interest and other split frames not associated with the second region of interest in response to dynamic changes to the second region of interest;

dynamically selecting third split frame streams of a higher resolution quality in the video bunch frame stream for split frames associated with the second region of interest in response to dynamic changes to the second region of interest;

dynamically selecting fourth split frame streams of a lower resolution quality in the video bunch frame stream for split frames not associated with the second region of interest in response to dynamic changes to the second region of interest;

dynamically combining the third split frame streams and the fourth split frame streams to form a second customized panoramic video stream that is dynamically adjusted in response to dynamic changes to the second region of interest; and sending the second customized panoramic video stream from the broadcasting device to the second viewer client device.

9. The method of claim 1, further comprising:

at least temporarily storing the video bunch frame stream in a storage device accessible to the encoding device;

uploading split frame information associated with the video bunch frame stream from the storage device to a streaming server assembly;

periodically receiving identifying information for a second region of interest from a second viewer client device at the streaming server assembly at least each time the second region of interest changes, wherein the second viewer client device is configured to permit the second region of interest to dynamically change in response to user actions at the second viewer client device associated with streaming video displayed on the second viewer client device, wherein the second region of interest is representative of at least a second portion of the panoramic view;

dynamically identifying split frames of the video bunch frame stream associated with the second region of interest and other split frames not associated with the second region of interest based at least in part on the split frame information in response to dynamic changes to the region of interest;

dynamically uploading third split frame streams of a higher resolution quality in the video bunch frame stream from the storage device to the streaming server assembly for split frames associated with the second region of interest in response to the dynamic changes to the second region of interest;

dynamically uploading fourth split fame streams of a lower resolution quality in the video bunch frame stream from the storage device to the streaming server assembly for other split frames not associated with the second region of interest in response to the dynamic changes to the second region of interest;

dynamically combining the third split frame streams and the fourth split frame streams to form a second customized panoramic video stream that is dynamically adjusted in response to dynamic changes to the second region of interest; and sending the on customized panoramic video stream from the streaming server assembly to the second viewer client device.

10. The method of claim 1 wherein the horizontal dimension associated with the panoramic view is 180 degrees and the vertical dimension associated with the panoramic view is 90 degrees.

11. The method of claim 1 wherein the panoramic video stream formed by the sequence of stitched panoramic frames is an equirectangular video stream formed by a sequence of stitched equirectangular frames, the horizontal dimension associated with the panoramic view is 360 degrees, and the vertical dimension associated with the panoramic view is 180 degrees.

12. The method of claim 1 wherein the pieces into which the stitched panoramic frames are split are defined by a predetermined configuration such that each piece is identifiable by its position within the stitched panoramic frame and such that the predetermined configuration is consistent from frame-to-frame for the panoramic video stream;

wherein the predetermined configuration for pieces of the stitched panoramic frames includes shape and size parameters for each split frame in a manner that permits split frames at different positions in the stitched panoramic frames to have different shapes and different sizes.

13. The method of claim 1 wherein the multiple bitrates for each split frame include at least three bitrates such that the multiple resolution qualities for each split frame stream include a high resolution quality, at least one intermediate resolution quality, and a low resolution quality.

14. An apparatus for streaming panoramic video, comprising:

an encoding device configured to receive a panoramic video stream formed by a sequence of stitched panoramic frames, wherein each stitched panoramic frame is representative of a panoramic view defined by horizontal and vertical dimensions in relation to a central viewing point, wherein the encoding device is configured to split the stitched panoramic frames into pieces to create a plurality of split frames and a corresponding plurality of split frame streams relating to split frame portions of the panoramic video stream, wherein the encoding device is configured to encode the plurality of split frames for each split frame stream at multiple bitrates to form multiple bitrate encodings corresponding to multiple resolution qualities for each split frame stream, wherein the multiple resolution qualities range from a highest resolution quality to a lowest resolution quality;

wherein the encoding device is configured to combine the multiple bitrate encodings for the plurality of split frame streams to form a video bunch frame stream, wherein the video bunch frame stream includes the multiple bitrate encodings for each split frame stream based on combining the multiple bitrate encodings; and a streaming server assembly configured to access the video bunch frame stream and configured to obtain first split frame streams and second split frame streams from the video bunch frame stream, wherein at least the first split frame streams are selected in response to a region of interest received from a viewer client device, wherein the region of interest is representative of at least a portion of the panoramic view, wherein the streaming server assembly is configured to combine the first split frame streams and the second split frame streams to form a customized panoramic video stream, wherein the streaming server assembly is configured to send the customized panoramic video stream to the viewer client device.

15. The apparatus of claim 14, further comprising:
one or more video capture devices configured to capture video feeds from a plurality of video cameras, wherein fields of view associated with the plurality of video cameras are such that combination of the fields of view provides coverage of the horizontal and vertical dimensions associated with the panoramic view as well as coverage of a corresponding inner surface view of a sphere where the central viewing point relates to a central point of the sphere; and
a stitching device;
wherein the one or more video capture devices are configured to send the captured video feeds to the stitching device;
wherein the stitching device is configured to convert frames of the captured video feeds into the stitched panoramic frames;
wherein the stitching device is configured to send the panoramic video stream with the stitched panoramic frames to the encoding device.

16. The apparatus of claim 14, further comprising:
a file upload device configured to upload one or more electronic files associated with a previously stitched and recorded panoramic video stream from a storage device, wherein the previously stitched and recorded panoramic video includes the stitched panoramic frames of the panoramic video stream;
wherein the file upload device is configured to process the one or more electronic files to form the panoramic video stream;
wherein the file upload device is configured to send the panoramic video stream to the encoding device.

17. The apparatus of claim 14, further comprising:
a broadcasting device;
wherein the encoding device is configured to send the video bunch frame stream to the broadcasting device;
wherein the broadcasting device is configured to at least temporarily store the video bunch frame stream in a storage device;
wherein the broadcasting device is configured to receive identifying information for a second region of interest from a second viewer client device, wherein the second region of interest is representative of at least a second portion of the panoramic view;
wherein the broadcasting device is configured to identify split frames of the video bunch frame stream associated with the second region of interest and other split frames not associated with the second region of interest;
wherein the broadcasting device is configured to select third split frame streams of a higher resolution quality in the video bunch frame stream for split frames associated with the second region of interest;
wherein the broadcasting device is configured to select fourth split frame streams of a lower resolution quality in the video bunch frame stream for split frames not associated with the second region of interest;
wherein the broadcasting device is configured to combine the third split frame streams and the fourth split frame streams to form a second customized panoramic video stream;
wherein the broadcasting device is configured to send the second customized panoramic video stream to the second viewer client device.

18. The apparatus of claim 14,
wherein the encoding device is configured to at least temporarily store the video bunch frame stream in a storage device;
wherein the streaming server assembly is configured to upload split frame information associated with the video bunch frame stream from the storage device;
wherein the streaming server assembly is configured to receive identifying information for the region of interest from the viewer client device;
wherein the streaming server assembly is configured to identify split frames of the video bunch frame stream associated with the region of interest and other split frames not associated with the region of interest based at least in part on the split frame information;
wherein the streaming server assembly is configured to upload the first split frame streams in the video bunch frame stream from the storage device based on the split frames associated with the region of interest;
wherein the streaming server assembly is configured to upload the second split frame streams in the video bunch frame stream from the storage device based on the other split frames not associated with the region of interest.

19. The apparatus of claim 14, further comprising:
a broadcasting device;
wherein the encoding device is configured to send the video bunch frame stream to the broadcasting device;
wherein the broadcasting device is configured to at least temporarily store the video bunch frame stream in a storage device;
wherein the broadcasting device is configured to periodically receive identifying information for a second region of interest from a second viewer client device at least each time the second region of interest changes, wherein the second viewer client device is configured to permit the second region of interest to dynamically change in response to user actions at the second viewer client device associated with streaming video displayed on the second viewer client device, wherein the second region of interest is representative of at least a second portion of the panoramic view;

wherein the broadcasting device is configured to dynamically identify split frames of the video bunch frame stream associated with the second region of interest and other split frames not associated with the second region of interest in response to dynamic changes to the second region of interest;

wherein the broadcasting device is configured to dynamically select third split frame streams of a higher resolution quality in the video bunch frame stream for split frames associated with the second region of interest in response to dynamic changes to the second region of interest;

wherein the broadcasting device is configured to dynamically select fourth split frame streams of a lower resolution quality in the video bunch frame stream for split frames not associated with the second region of interest in response to dynamic changes to the second region of interest;

wherein the broadcasting device is configured to dynamically combine the third split frame streams and the fourth split frame streams to form a second customized video stream that is dynamically adjusted in response to dynamic changes to the second region of interest;

wherein the broadcasting device is configured to send the second customized panoramic video stream to the second viewer client device.

20. The apparatus of claim 14, wherein the encoding device is configured to at least temporarily store the video bunch frame stream in a storage device;

wherein the streaming server assembly is configured to upload split frame information associated with the video bunch frame stream from the storage device;

wherein the streaming server assembly is configured to periodically receive identifying information for a second region of interest from a second viewer client device at least each time the second region of interest changes, wherein the second viewer client device is configured to permit the second region of interest to dynamically change in response to user actions at the second viewer client device associated with streaming video displayed on the second viewer client device, wherein the second region of interest is representative of at least a second portion of the panoramic view;

wherein the streaming server assembly is configured to dynamically identify split frames of the video bunch frame stream associated with the second region of interest and other split frames not associated with the second region of interest based at least in part on the split frame information in response to dynamic changes to the region of interest;

wherein the streaming server assembly is configured to dynamically upload third split frame streams of a higher resolution quality in the video bunch frame stream from the storage device for split frames associated with the second region of interest in response to the dynamic changes to the second region of interest;

wherein the streaming server assembly is configured to dynamically upload fourth split frame streams of a lower resolution quality in the video bunch frame stream from the storage device for other split frames not associated with the second region of interest in response to the dynamic changes to the second region of interest;

wherein the streaming server assembly is configured to dynamically combine the third split frame streams and the fourth split frame streams to form a second customized panoramic video stream that is dynamically adjusted in response to dynamic changes to the second region of interest;

wherein the streaming server assembly is configured to send the second customized panoramic video stream to the second viewer client device.

21. A non-transitory computer-readable medium storing program instructions that, when executed by at least one computer or processor, cause a computer-controlled system to perform a method of streaming panoramic video, the method comprising:

receiving a panoramic video stream formed by a sequence of stitched panoramic frames at an encoding device, wherein each stitched panoramic frame is representative of a panoramic view defined by horizontal and vertical dimensions in relation to a central viewing point;

splitting the stitched panoramic frames into pieces to create a plurality of split frames and a corresponding plurality of split frame streams relating to split frame portions of the panoramic video stream;

encoding the plurality of split frames for each split frame stream at multiple bitrates to form multiple bitrate encodings corresponding to multiple resolution qualities for each split frame stream, wherein the multiple resolution qualities range from a highest resolution quality to a lowest resolution quality;

combining the multiple bitrate encodings for the plurality of split frame streams to form a video bunch frame stream, wherein the video bunch frame stream includes the multiple bitrate encodings for each split frame stream based on the combining;

combining first split frame streams of a higher resolution quality and second split frame streams of a lower resolution quality to form a customized panoramic video stream from the video bunch frame stream, wherein at least the first split frame streams are selected in response to a region of interest received from a viewer client device, wherein the region of interest is representative of a least a portion of the panoramic view; and sending the customized panoramic video stream to the viewer client device.

* * * * *